(12) United States Patent
Kim et al.

(10) Patent No.: US 10,440,751 B2
(45) Date of Patent: Oct. 8, 2019

(54) METHOD AND DEVICE FOR ENABLING STATION TO RECEIVE SIGNAL IN WIRELESS COMMUNICATION SYSTEM

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Suhwook Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/502,770

(22) PCT Filed: Aug. 10, 2015

(86) PCT No.: PCT/KR2015/008334
§ 371 (c)(1),
(2) Date: Feb. 8, 2017

(87) PCT Pub. No.: WO2016/024770
PCT Pub. Date: Feb. 18, 2016

(65) Prior Publication Data
US 2017/0245306 A1    Aug. 24, 2017

Related U.S. Application Data

(60) Provisional application No. 62/035,488, filed on Aug. 10, 2014, provisional application No. 62/127,282, filed on Mar. 2, 2015, provisional application No. 62/142,501, filed on Apr. 3, 2015.

(51) Int. Cl.
*H04W 74/08*    (2009.01)
*H04W 72/04*    (2009.01)
(Continued)

(52) U.S. Cl.
CPC ......... *H04W 74/0833* (2013.01); *H04L 69/04* (2013.01); *H04L 69/323* (2013.01);
(Continued)

(58) Field of Classification Search
CPC ............ H04W 84/12; H04W 72/0413; H04W 74/0833; H04W 88/02; H04W 28/06; H04L 29/06; H04L 29/08; H04B 7/2612
See application file for complete search history.

(56) References Cited

U.S. PATENT DOCUMENTS 9,515,925 B2 * 12/2016 Wentink .............. H04L 29/0604
9,602,635 B2 *  3/2017 Stacey ..................... H04L 69/22
(Continued)

FOREIGN PATENT DOCUMENTS

CA        2835447        11/2012
CN      102844999        12/2012
(Continued)

OTHER PUBLICATIONS

European Patent Office Application Serial No. 15831830.3, Search Report dated Feb. 12, 2018, 10 pages.
(Continued)

*Primary Examiner* — Ayaz R Sheikh
*Assistant Examiner* — Debebe A Asefa
(74) *Attorney, Agent, or Firm* — Lee Hong Degerman Kang & Waimey

(57) ABSTRACT

The present disclosure relates to a method of receiving, by a station that operates in a wireless LAN system, a signal in a wireless communication system. In this case, it is possible to include the steps of receiving a PPDU that includes an MAC frame, decoding the MAC frame, and checking information in the MAC frame based on the MAC header of the MAC frame that includes a first address field and a second address field. In this case, when the PPDU includes the identification information (ID) of a station, the MAC header may include only one of any of the first address field and the second address field.

13 Claims, 23 Drawing Sheets

(51) Int. Cl.
*H04L 29/06* (2006.01)
*H04W 74/00* (2009.01)
*H04W 92/10* (2009.01)
*H04L 29/08* (2006.01)
*H04W 84/12* (2009.01)
*H04W 88/02* (2009.01)
*H04W 8/26* (2009.01)
*H04W 72/12* (2009.01)

(52) U.S. Cl.
CPC ....... *H04L 69/324* (2013.01); *H04W 72/0413* (2013.01); *H04W 74/006* (2013.01); *H04W 92/10* (2013.01); *H04W 8/26* (2013.01); *H04W 72/1268* (2013.01); *H04W 84/12* (2013.01); *H04W 88/02* (2013.01)

(56) References Cited

U.S. PATENT DOCUMENTS

| | | | |
|---|---|---|---|
| 2007/0153757 | A1 | 7/2007 | Kim et al. |
| 2012/0051312 | A1 | 3/2012 | Noh et al. |
| 2012/0314695 | A1 | 12/2012 | Liu |
| 2013/0128807 | A1* | 5/2013 | Vermani ............... H04L 5/0053 370/328 |
| 2013/0142095 | A1 | 6/2013 | Calcev et al. |
| 2013/0294431 | A1 | 11/2013 | Wang et al. |

FOREIGN PATENT DOCUMENTS

| | | |
|---|---|---|
| CN | 103188146 | 7/2013 |
| CN | 103621033 | 3/2014 |
| CN | 103718596 | 4/2014 |
| KR | 1020080106825 | 12/2008 |
| KR | 1020130018308 | 2/2013 |
| RU | 2012127571 | 1/2014 |
| WO | 2006041673 | 4/2006 |
| WO | 2012170864 | 12/2012 |
| WO | 2013067316 | 5/2013 |
| WO | 2013085365 | 6/2013 |
| WO | 2013137603 | 9/2013 |
| WO | 2014/058192 | 4/2014 |
| WO | 2014058193 | 4/2014 |

OTHER PUBLICATIONS

Canadian Intellectual Property Office Application No. 2,957,183, Office Action dated Nov. 27, 2017, 5 pages.
PCT International Application No. PCT/KR2015/008334, Written Opinion of the International Searching Authority dated Dec. 16, 2015, 22 pages.
Russian Federation Federal Service for Intellectual Property, Patents and Trademarks Application Serial No. 2017103650/08, Office Action dated Jun. 1, 2018, 16 pages.
Chinese application No. 201580043056.8, Office Action dated Jan. 30, 2019, 6 pages.
European patent application No. 15831830.3, European Office Action dated Nov. 29, 2018, 8 pages.

* cited by examiner

FIG. 18

|  | B0 B1 | B2 | B3 | B4 B9 | B10 B12 | B13 B15 | B16 B18 | B19 B21 | B22 | B23 |
|---|---|---|---|---|---|---|---|---|---|---|
| Composite Name: | | Reserved | STBC | Group ID | NSTS/Partial AID | | | | TXOP PS NOT ALLOWED | Reserved |
| SU Name: | BW | | | | SU NSTS | Partial AID | | | | |
| MU Name: | | | | | MU[0] NSTS | MU[1] NSTS | MU[2] NSTS | MU[3] NSTS | | |
| Bits: | 2 | 1 | 1 | 6 | 3 | 3 | 3 | 3 | 1 | 1 |

(a)

|  | B0 | B1 | B2 | B3 | B4 B5 B6 B7 | | | | B8 | B9 | B10 B17 | B18 B23 |
|---|---|---|---|---|---|---|---|---|---|---|---|---|
| Composite Name: | Short GI | Short GI NSYM Disambiguation | SU/MU[0] Coding | LDPC Extra OFDM symbol | SU VHT-MCS/MU[1-3] Coding | | | | Beam-formed | Reserved | CRC | Tail |
| SU Name: | | | | | SU VHT-MCS | | | | Beam-formed | | | |
| MU Name: | | | | | MU[1] Coding | MU[2] Coding | MU[3] Coding | Reserved | Reserved | | | |
| Bits: | 1 | 1 | 1 | 1 | 1 | 1 | 1 | 1 | 1 | 1 | 8 | 6 |

(b)

FIG. 19
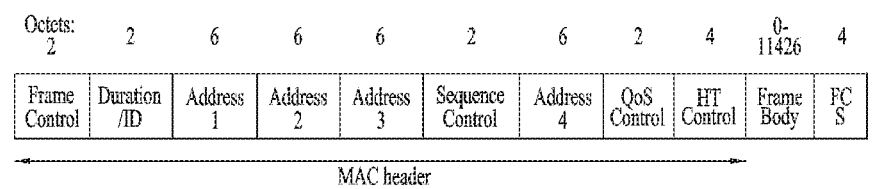
FIG. 20
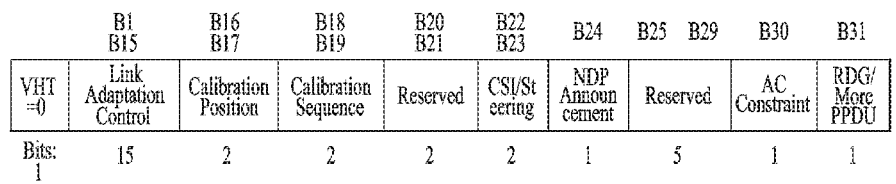
(a)
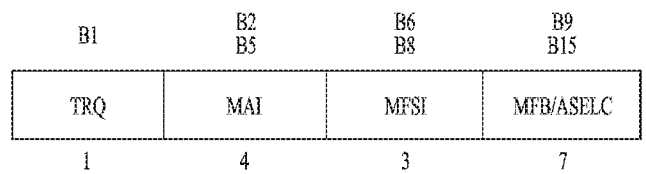
(b)

FIG. 21

| | B1 | B2 | B3 B5 | B6 B8 | B9 B23 | B24 B26 | B27 | B28 | B29 | B30 | B31 |
|---|---|---|---|---|---|---|---|---|---|---|---|
| | VHT=1 | Reserved | MRQ | MSI | MFSI/GID-L | MFB | GID-H | Coding Type | FB Tx Type | Unsolicited MFB | AC Constraint | RDG/More PPDU |
| Bits: | 1 | 1 | 1 | 3 | 3 | 15 | 3 | 1 | 1 | 1 | 1 | 1 |

(a)

| B9 B11 | B12 B15 | B16 B17 | B16 B23 |
|---|---|---|---|
| VHT N_STS | MCS | BW | SNR |
| 3 | 4 | 2 | 6 |

| | Frame Control | A1 | A2 | Sequence Control | A3 | A4 | Frame Body | FCS |
|---|---|---|---|---|---|---|---|---|
| Octets: | 2 | 2 or 6 | 6 or 2 | 0 or 2 | 0 or 6 | 0 or 6 | variable | 4 |

(a)

| | B0 B1 | B2 B4 | B5 B7 | B8 | B9 | B10 | B11 | B12 | B13 | B14 | B15 |
|---|---|---|---|---|---|---|---|---|---|---|---|
| | Protocol Version | Type | PTID/Subtype | From DS | More Fragments | Power Managements | More Data | Protected Frame | End of Service Period | Relayed Frame | Ack Policy |
| Bits: | 2 | 3 | 3 | 1 | 1 | 1 | 1 | 1 | 1 | 1 | 1 |

| Frame Control | Duration | Address 1 | Sequence Control | Address 3 | Address 4 | HT Control | Frame Body | FCS |
|---|---|---|---|---|---|---|---|---|
| 2 | 0 or 2 | 6 | 0 or 2 | 0 or 6 | 0 or 6 | 0 or 4 | variable | 4 |

Octets:

MAC header (a)

| Frame Control | Duration | Address 1 / Address 2 | Sequence Control | Address 3 | Address 4 | HT Control | Frame Body | FCS |
|---|---|---|---|---|---|---|---|---|
| 2 | 0 or 2 | 6 | 0 or 2 | 0 or 6 | 0 or 6 | 0 or 4 | variable | 4 |

Octets:

MAC header (b)

FIG. 27

| Frame Control (DL) | Duration | Sender Address | Sequence Control | Address 3 | Address 4 | HT Control | Frame Body | FCS |
|---|---|---|---|---|---|---|---|---|
| 2 | 0 or 2 | 6 | 0 or 2 | 0 or 6 | 0 or 6 | 0 or 4 | variable | 4 |

Octets:

MAC header (a)

| Frame Control (DL) | Duration | Address 2 (TA) | Sequence Control | Address 3 | Address 4 | HT Control | Frame Body | FCS |
|---|---|---|---|---|---|---|---|---|
| 2 | 0 or 2 | 6 | 0 or 2 | 0 or 6 | 0 or 6 | 0 or 4 | variable | 4 |

Octets:

MAC header (b)

| Frame Control (UL) | Duration | Receiver Address | Sequence Control | Address 3 | Address 4 | HT Control | Frame Body | FCS |
|---|---|---|---|---|---|---|---|---|
| 2 | 0 or 2 | 6 | 0 or 2 | 0 or 6 | 0 or 6 | 0 or 4 | variable | 4 |

Octets:

MAC header (c)

FIG. 30
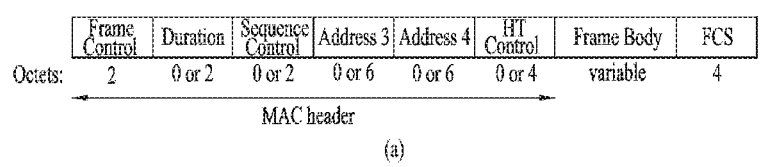
(a)
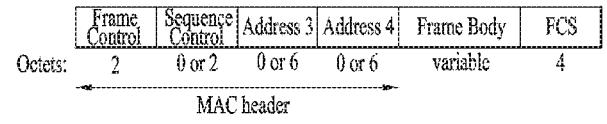
(b)
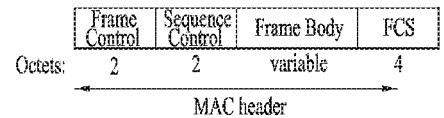
(c)

FIG. 31
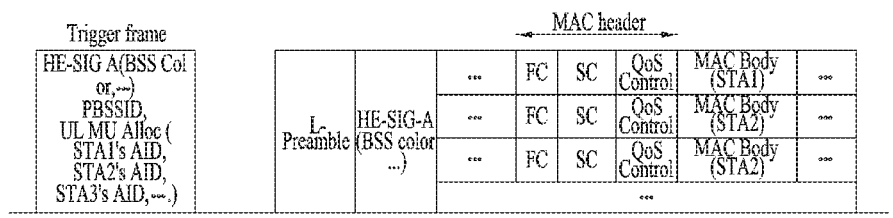
FIG. 32
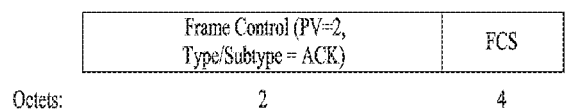
FIG. 33
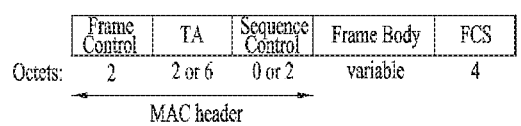
(a)
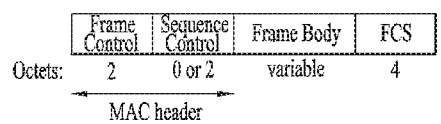
(b)

METHOD AND DEVICE FOR ENABLING STATION TO RECEIVE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2015/008334, filed on Aug. 10, 2015, which claims the benefit of U.S. Provisional Application No. 62/035,488, filed on Aug. 10, 2014, 62/127,282, filed on Mar. 2, 2015, and 62/142,501, filed on Apr. 3, 2015, the contents of which are all hereby incorporated by reference herein in their entirety.

TECHNICAL FIELD

The present disclosure relates generally to a wireless communication system, and more particularly, to a method and apparatus for receiving a signal at a station in a wireless communication system.

BACKGROUND ART

While a signal transmission method proposed below is applicable to various types of wireless communication, a Wireless Local Area Network (WLAN) system will be described as an exemplary system to which the present disclosure is applicable.

WLAN Standards have been developed as Institute of Electrical and Electronics Engineers (IEEE) 802.11. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present disclosure is to provide a method and apparatus for receiving a signal at a Station (STA) in a wireless communication system.

Another object of the present disclosure is to provide a compressed Medium Access Control (MAC) header by reducing unnecessary information in a MAC header of a MAC frame received by an STA in a wireless communication system.

Another object of the present disclosure is to provide a method for increasing the use efficiency of radio resources by preventing transmission of redundant information and thus preventing unnecessary resource consumption in a wireless communication system.

Technical Solution

To achieve these objects and other advantages and in accordance with the purpose of the invention, a method for receiving a signal by a Station (STA) in a Wireless Local Area Network (WLAN) system, the method comprising: receiving a Physical layer Protocol Data Unit (PPDU) including a Medium Access Control (MAC) frame; decoding the MAC frame; and checking information included in the MAC frame based on a MAC header of the MAC frame, the MAC header including a first address field and a second address field, wherein the MAC header includes only one of the first address field and the second address field when an Identifier (ID) of the STA is included in the PPDU.

To achieve these objects and other advantages and in accordance with the purpose of the invention, a Station (STA) for receiving a signal in a Wireless Local Area Network (WLAN) system, the STA comprising: a transceiver module for exchanging data with an external device; and a processor for controlling the transceiver module, wherein the processor is configured to: receive a Physical layer Protocol Data Unit (PPDU) including a Medium Access Control (MAC) frame through the transceiver module, decode the MAC frame, and check information included in the MAC frame based on a MAC header of the MAC frame, the MAC header including a first address field and a second address field, and wherein the MAC header includes only one of the first address field and the second address field when an Identifier (ID) of the STA is included in the PPDU.

The following description may be commonly applied to the embodiments of the present invention.

The first address field indicates a receiver address, and the second address field indicates a transmitter address.

If the data is received on Downlink (DL), the MAC frame includes only the second address field without the first address field.

If the data is received on Uplink (UL), the MAC frame includes only the first address field without the second address field.

The MAC header further includes a Frame Control field including a first indicator, and wherein the first indicator indicates whether the data is received on the UL or the DL.

The Frame Control field further includes a Type field, and wherein if the Type field is set to a first value, the MAC header includes only one of the first address field and the second address field.

The MAC frame is configured based on Uplink Multi-User (UL MU). If a trigger frame is received from an Access Point (AP) STA before receiving the data, the MAC header does not include either of the first address field and the second address field.

The MAC header without the first and second address fields is likely to be a compressed MAC header, and a third indicator indicates whether the MAC header is a compressed MAC header.

The MAC frame further includes a Duration field, and wherein if the data includes the Duration field, the MAC frame does not include the Duration field.

The AP STA performs MU resource allocation for random access by a trigger frame and the STA transmits UL data by randomly accessing an allocated position of the random access resources, the MAC header includes only the second address field without the first address field.

The ID of the STA is included in a Signal (SIG) field of the data. The SIG field further includes a second indicator, and wherein if the second indicator is set to a first value, the ID of the STA is included as a receiver ID in the SIG field, and if the second indicator is set to a second value, the ID of the STA is included as a transmitter ID in the SIG field.

Advantageous Effects

The present disclosure can provide a method and apparatus for receiving a signal at an STA in a wireless communication system.

The present disclosure can provide a compressed MAC header by reducing unnecessary information in a MAC header of a MAC frame received by an STA in a wireless communication system.

The present disclosure can provide a method for increasing the use efficiency of radio resources by preventing transmission of redundant information and thus preventing unnecessary resource consumption in a wireless communication system.

It will be appreciated by persons skilled in the art that that the effects that can be achieved through the present disclosure are not limited to what has been particularly described hereinabove and other advantages of the present disclosure will be more clearly understood from the following detailed description.

BRIEF DESCRIPTION OF THE DRAWINGS

FIGS. 14 to 18 are views illustrating exemplary frame structures in an Institute of Electrical and Electronics Engineers (IEEE) 802.11 system.

FIGS. 19, 20, and 21 are views illustrating a Medium Access Control (MAC) frame format.

FIG. 22 is a view illustrating a Short MAC frame format.

FIG. 26 is a view illustrating a MAC frame structure based on UL MU.

FIG. 27 is a view illustrating MAC frame formats based on an indicator.

FIG. 30 is a view illustrating another MAC frame structure based on UL MU.

FIG. 31 is a view illustrating a method for transmitting frames based on a trigger frame by a plurality of STAs.

FIG. 32 is a view illustrating an exemplary ACKnowledgement (ACK) control frame configured based on FIG. 31.

FIG. 33 is a view illustrating a MAC frame structure based on random access.

BEST MODE FOR CARRYING OUT THE DISCLOSURE

Mode for Carrying Out the Disclosure

Figure 1:
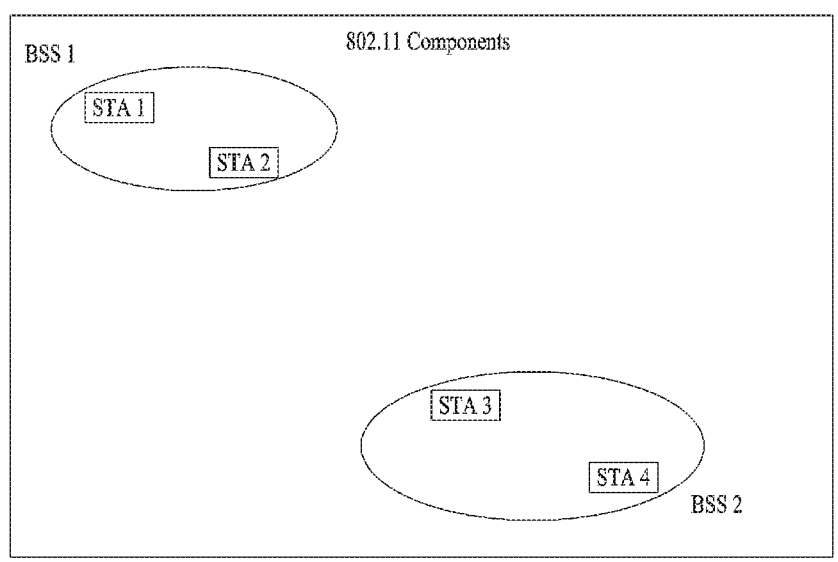
FIG. 1 is a view illustrating an exemplary configuration of a Wireless Local Area Network (WLAN) system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

In the present disclosure, a terminology, each of which includes such an ordinal number as 1st, 2nd and the like, may be used to describe various components. In doing so, the various components should be non-limited by the corresponding terminologies, respectively. The terminologies are only used for the purpose of discriminating one component from other components. For example, a first configuration element can be referred to as a second configuration element, similarly, the second configuration element can be referred to as the first configuration element while not being deviated from the scope of right according to the concept of the present specification.

In the present application, such a terminology as 'comprise', 'include' and the like should be construed not as excluding existence of a different configuration element but as designating further existence of a different configuration element. In this disclosure, such a terminology as ' . . . unit', ' . . . part' corresponds to a unit for processing at least one or more functions or operations. The unit can be implemented by a combination of hardware and/or software.

FIG. 1 is a view illustrating an exemplary configuration of a Wireless Local Area Network (WLAN) system.

As depicted in FIG. 1, a wireless local area network includes at least one Basic Service Set (BSS). The BSS is a set of Stations (STA) capable of communicating with each other by successfully performing synchronization.

The STA is a logical entity including a physical layer interface for a Medium Access Control (MAC) and wireless media. The STA includes an Access Point (AP) and a Non-AP STA. A mobile terminal operated by a user corresponds to the Non-AP STA among the STAs. If it is simply called an STA, the STA may correspond to the Non-AP STA. The Non-AP STA can be called such a different name as a terminal, a Wireless Transmit/Receive Unit (WTRU), User Equipment (UE), a Mobile Station (MS), a Mobile Terminal, a Mobile Subscriber Unit, or the like.

And, the AP is an entity providing an STA associated to the AP with an access to a Distribution System (DS) via the wireless media. The AP can be called a concentrated controller, a Base Station (BS), a Node-B, a Base Transceiver System (BTS), a site controller, or the like.

The BSS can be divided into an infrastructure BSS and an Independent BSS (IBSS).

The BSS depicted in FIG. 1 corresponds to the IBSS. The IBSS means the BSS not including an AP. Since the IBSS does not include the AP, an access to the DS is not permitted to the IBSS. Thus, the IBSS forms a self-contained network.

Figure 2:
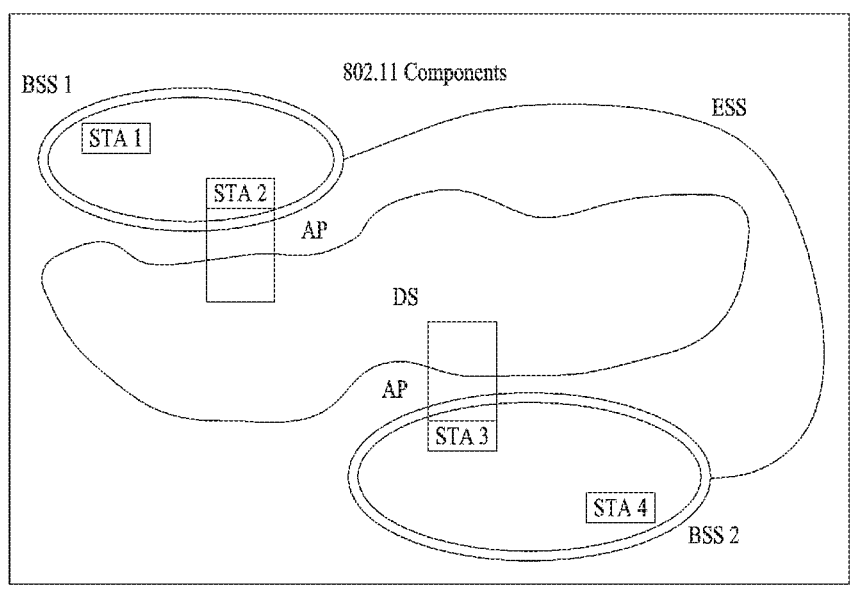
FIG. 2 is a view illustrating another exemplary configuration of a WLAN system.

FIG. 2 is a view illustrating another exemplary configuration of a WLAN system.

The BSS depicted in FIG. 2 corresponds to the infrastructure BSS. The infrastructure BSS includes at least one STA and an AP. Although a principle of a communication between non-AP STAs is to perform the communication via the AP, if a link is directly established between the non-AP STAs, it is possible to directly communicate between the non-AP STAs.

As depicted in FIG. 2, a plurality of infrastructure BSSs can be connected to each other via the DS. A plurality of the infrastructure BSSs connected through the DS is called an Extended Service Set (ESS). STAs included in the ESS can communicate with each other and a non-AP STA can move from one BSS to another BSS while seamlessly communicating in an identical ESS.

The DS is a mechanism connecting a plurality of APs to each other and the DS is not necessarily to be a network. If the DS is able to provide a prescribed distribution service, there is no limit on a form of the DS. For instance, the DS may correspond to such a wireless network as a mesh network or may correspond to a physical structure connecting APs to each other.

Figure 3:
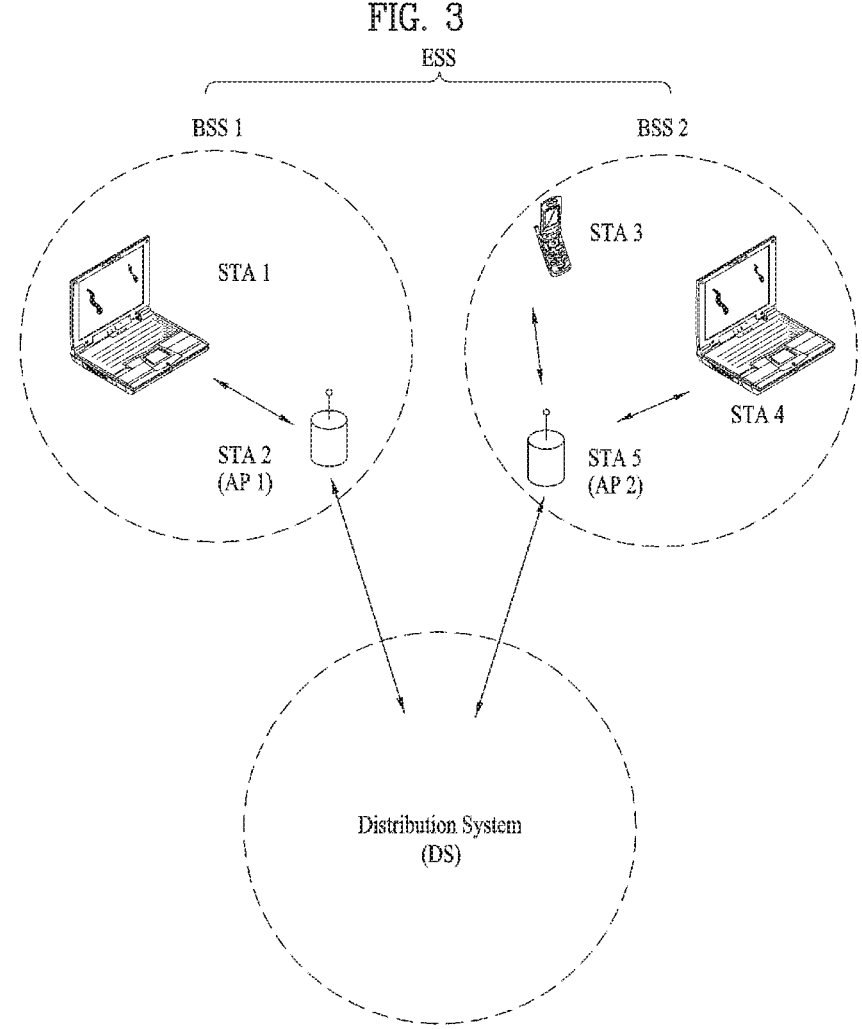
FIG. 3 is a view illustrating an exemplary structure of a WLAN system.

FIG. 3 is a view illustrating an exemplary structure of a WLAN system. In FIG. 3, an example of an infrastructure BSS including a DS is described.

Referring to an example of FIG. 3, ESS includes a BSS1 and BSS2. In a WLAN system, a station corresponds to a device operating according to MAC/PHY regulation of IEEE 802.11. A station includes an AP station and a non-AP station. In general, the non-AP station corresponds to such a device directly handled by a user as a laptop computer, a mobile phone, and the like. In the example of FIG. 3, a station 1, a station 3, and a station 4 correspond to the non-AP station and a station 2 and a station 5 correspond to the AP station.

In the following description, the non-AP station may be referred to as a terminal, a Wireless Transmit/Receive Unit (WTRU), a User Equipment (UE), a Mobile Station (MS), a mobile terminal, a Mobile Subscriber Station (MSS), and the like. And, the AP corresponds to a Base Station (BS), a Node-B, an evolved Node-B (eNB), a Base Transceiver System (BTS), a femto BS, and the like.

Figure 4:
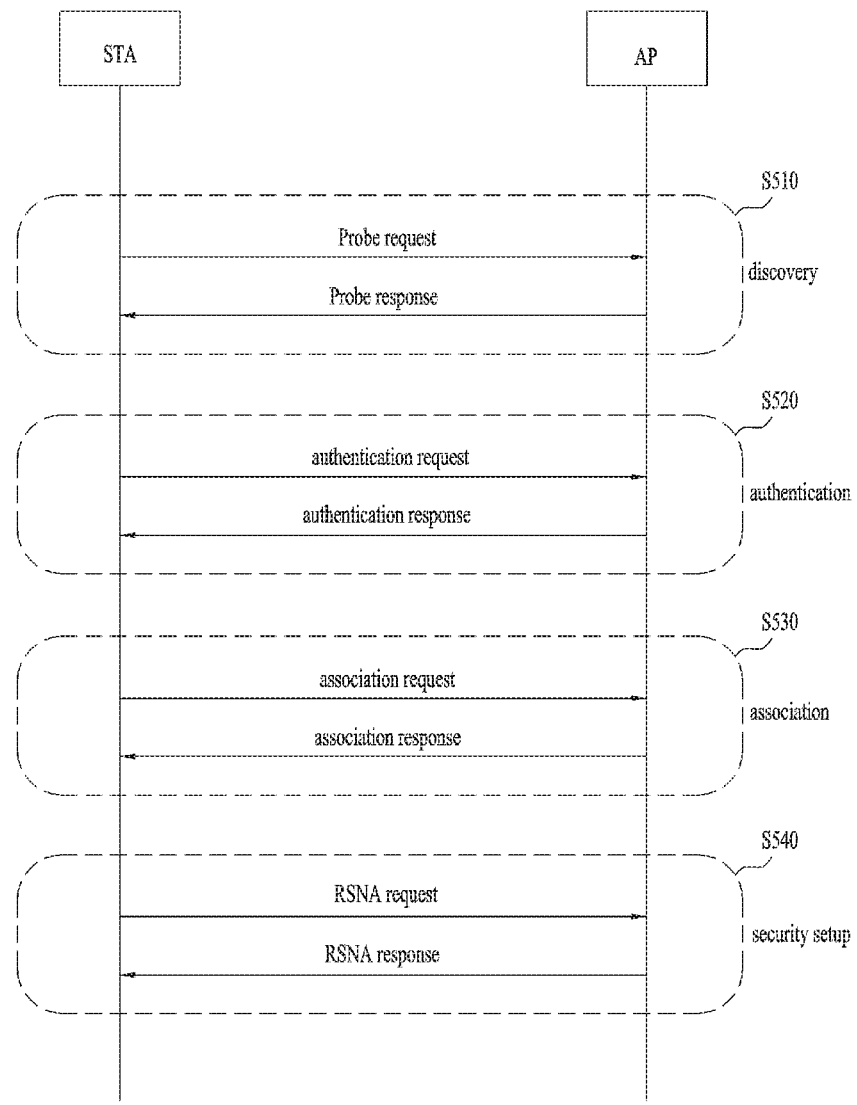
FIG. 4 is a view illustrating a signal flow for a general link setup procedure in a WLAN system.
Figure 5:
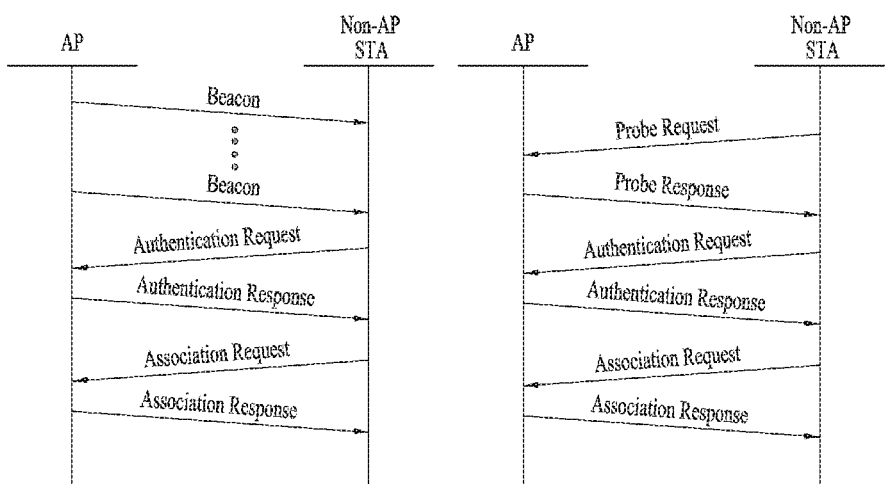
FIG. 5 is a view illustrating signal flows for an active scanning method and a passive scanning method.

FIG. 4 is a flowchart illustrating a link setup procedure in a WLAN system, and FIG. 5 is a view illustrating an active scanning method and a passive scanning method.

In order for an STA to set up a link with a network and transceive data with the network, it is necessary for the station to discover the network, perform authentication, establish association, and pass through an authentication procedure for security. The link setup procedure can also be referred to as a session initiation procedure or a session setup procedure. And, discovery, authentication, association, and security setup procedures of the link setup procedure can be commonly called an association procedure.

An example of the link setup procedure is explained in the following with reference to FIG. 4.

In the step S410, an STA can perform a network discovery operation. The network discovery operation can include a scanning operation of the STA. In particular, in order for the STA to access a network, it is necessary for the STA to find out a network in which the STA is able to participate. The STA needs to identify a compatible network before participating in a wireless network. A procedure of identifying a network existing at a specific region is called scanning.

A scanning scheme includes active scanning and passive scanning. In FIG. 4, although a network discovery operation including an active scanning procedure is explained for example, an STA may operate with a passive scanning procedure.

According to the active scanning, a scanning performing STA transmits a probe request frame to a responder to discover an AP existing in the vicinity of the STA and waits for a response. The responder transmits a probe response frame to the STA, which has transmitted the probe request frame, in response to the probe request frame. In this case, the responder may correspond to an STA, which has lastly transmitted a beacon frame in a BSS on a channel being scanned. In the BSS, since an AP transmits a beacon frame, the AP becomes the responder. In an IBSS, since STAs in the IBSS alternately transmit a beacon, the responder is not fixed. For example, if an STA transmits a probe request frame on a channel 1 and receives a probe response frame on the channel 1, the STA stores BSS-related information included in the received probe response frame, moves to a next channel (e.g., a channel 2), and may be able to perform scanning (i.e., transmit and receive a probe request/response on the channel 2) using an identical method.

Referring to FIG. 5, scanning can also be performed by a passive scanning scheme. According to the passive scanning, a scanning performing STA waits for a beacon frame while switching a channel A beacon frame is one of management frames in IEEE 802.11. The beacon frame is periodically transmitted to notify the existence of a wireless network and make the scanning performing STA discover and participate in the wireless network. In a BSS, an AP plays a role in periodically transmitting a beacon frame. In an IBSS, STAs belonging to the IBSS alternately transmit a beacon frame. Having received a beacon frame, the scanning performing STA stores information on the BSS included in the beacon frame and records beacon frame information on each channel while switching to a different channel Having received a beacon frame, an STA stores BSS-related information included in the received beacon frame, moves to a next channel, and may be able to perform scanning on the next channel using an identical method.

When the active scanning and the passive scanning are compared, the active scanning has a merit in that delay is less and power consumption is lower compared to the passive scanning.

After the network is discovered by the STA, an authentication procedure can be performed in the step S420. In order to clearly distinguish the authentication procedure from a security setup operation of the step S440, the authentication procedure can be referred to as a first authentication procedure.

According to the authentication procedure, the STA transmits an authentication request frame to the AP and the AP transmits an authentication response frame to the STA in response to the authentication request frame. An authentication frame used in the authentication request/response corresponds to a management frame.

The authentication frame include information on an authentication algorithm number, an authentication transaction sequence number, a status code, a challenge text, a Robust Security Network (RSN), a finite cyclic group, and the like. The above-mentioned information is just an example of information capable of being included in the authentication request/response. The information can be replaced with different information or may further include additional information.

The STA can transmit the authentication request frame to the AP. The AP can determine whether to grant authentication on the STA based on the information included in the received authentication request frame. The AP can transmit a result of the authentication procedure to the STA via the authentication response frame.

If the STA is successfully authenticated, an association procedure can be performed in the step S430. According to the association procedure, the STA transmits an association request frame to the AP and the AP transmits an association response frame to the STA in response to the association request frame.

For example, the association request frame can include such information as information related to various capabilities, a beacon listening interval, an SSID (service set identifier), supported rates, supported channels, an RSN, a mobility domain, supported operating classes, a TIM (traffic indication map broadcast request), interworking service capability, and the like.

For example, the association response frame can include such information as information related to various capabilities, a status code, an Association ID (AID), supported rates, an Enhanced Distributed Channel Access (EDCA), a parameter set, a Received Channel Power Indicator (RCPI), a Received Signal to Noise Indicator (RSNI), a mobility domain, a timeout interval (association comeback time), an overlapped BSS scan parameter, TIM broadcasting response, QoS map, and the like.

The above-mentioned information is just an example of information capable of being included in the association request/response frame. The information can be replaced with different information or may further include additional information.

If the STA is successfully associated with the network, the security setup procedure can be performed in the step S540. The security setup procedure of the step S440 can also be referred to as an authentication procedure via an RSNA (robust security network association) request/response. The authentication procedure of the step S520 can be referred to as a first authentication procedure and the security setup procedure of the step S540 can be simply referred to as an authentication procedure.

For example, the security setup procedure of the step S440 may include a private key setup procedure via 4-way handshaking through an Extensible Authentication Protocol over LAN (EAPOL) frame. And, the security setup procedure can also be performed according to a security scheme not defined in IEEE 802.11 standard.

Based on the aforementioned discussion, a collision detection technique in a WLAN system is explained in the following.

As mentioned in the foregoing description, since various elements influence on a channel in wireless environment, a transmitting end is unable to precisely detect a collision. Hence, 802.11 has introduced a Distributed Coordination Function (DCF) corresponding to a Carrier Sense Multiple Access/Collision Avoidance (CSMA/CA) mechanism.

Figure 6:
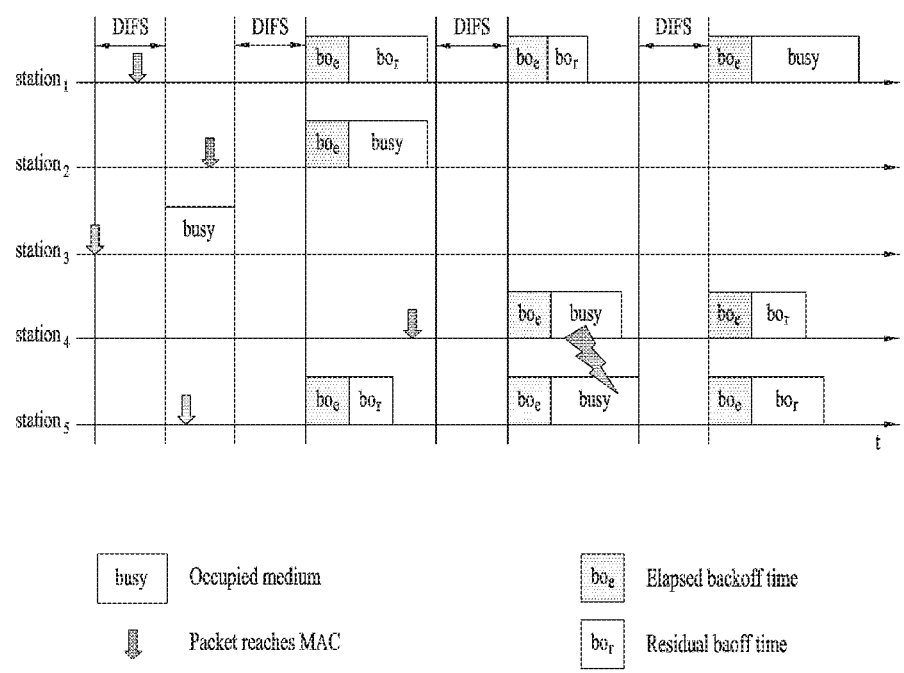
FIG. 6 is a view illustrating a Distributed Coordination Function (DCF) mechanism in a WLAN system.

FIG. 6 is a view illustrating a DCF mechanism in a WLAN system.

A DCF performs Clear Channel Assessment (CCA) that senses a medium during a specific period (e.g., DIFS: DCF inter-frame space) before data is transmitted by STAs including data to be transmitted. In this case, if a medium is idle (available), an STA can transmit a signal using the medium. However, if a medium is busy (unavailable), an STA can transmit data after waiting for a period as much as a random backoff period in addition to a DIFS under an assumption that many STAs are waiting for the use of the medium. In this case, the random backoff period plays a role in avoiding a collision. If it is assumed that there are many STAs to transmit data, each of the STAs has a statistically different backoff interval value. Consequently, each of the STAs has different transmission timing. If an STA starts to transmit data using the medium, other STAs are unable to use the medium.

A random backoff time and a procedure are briefly explained in the following.

If a state of a specific medium is switched to idle from busy, a plurality of STAs start to prepare for data transmission. In this case, in order to minimize collision, each of a plurality of the STAs intending to transmit data selects a random backoff count and waits for slot time as much as the random backoff count. The random backoff count is a pseudo-random integer value and the value is selected from among values uniformly distributed in a range of [0 CW]. In this case, the CW stands for 'contention window'.

A CW parameter selects a CWmin value as an initial value. If transmission fails, the CWmin value becomes twice the initial value. For example, if it fails to receive an ACK response in response to a transmitted data frame, it may consider it as a collision. If a CW value has a CWmax value, the CWmax value is maintained until data transmission is succeeded. The CW value is reset to the CWmin value when the data transmission is succeeded. In this case, in order to conveniently implement and operate the CW, the CWmin, and the CWmax, it is preferable to configure the CW, the CWmin, and the CWmax to be maintained by 2n−1.

Meanwhile, if a random backoff procedure starts, an STA selects a random backoff count from among a range of [0 CW] and continuously monitors a medium while a backoff slot is countdown. If the medium is switched to a busy state, the STA temporarily stops countdown. If the medium is switched back to the idle, the STA resumes countdown of the backoff slot.

Referring to FIG. 6, many STAs intend to transmit data. In case of an STA 3, since a medium was idle as much as a DIFS, the STA 3 immediately transmits a data frame and the rest of STAs wait until the medium becomes idle. Since the medium was busy for a while, a plurality of STAs are waiting for a chance of using the medium. Hence, each of a plurality of the STAs selects a random backoff count. In this case, FIG. 6 shows a case that an STA 2, which has selected a smallest backoff count, transmits a data frame.

After the transmission of the STA 2 is finished, the medium becomes idle again and the STAs resume countdown for the temporarily stopped backoff interval. Referring to FIG. 6, although an STA 5, which has a next smallest random backoff count value and temporarily stopped countdown when the medium is busy, count downs the remaining backoff slot and transmits a data frame, it is overlapped with a random backoff count value of an STA 4 by chance. It is able to see that a collision occurs. In this case, since both the STA 5 and the STA 4 are unable to receive an ACK response in response to a transmitted data, the STAs select a random backoff count value again after CW is increased as much as twice.

As mentioned in the foregoing description, the most fundamental principle of the CSMA/CA is carrier sensing. A terminal is able to use physical carrier sensing and virtual carrier sensing to determine whether or not a DCF medium is busy/idle. The physical carrier sensing is performed at a PHY (physical layer) and the physical carrier sensing is performed through energy detection or preamble detection. For example, if it is determined as a receiving end has measured a power level or has read a preamble, it can be considered as a medium is busy. The virtual carrier sensing is performed by setting a Network Allocation Vector (NAV) to make other STAs not transmit data. The virtual carrier sensing is performed through a duration field value of a MAC header. Meanwhile, in order to reduce possibility of collision, a robust collision detection mechanism has been introduced. The reason for the introduction of the robust collision detection mechanism can be checked by two examples described in the following. For clarity, assume that a carrier sensing range is identical to a transmission range.

Figure 7:
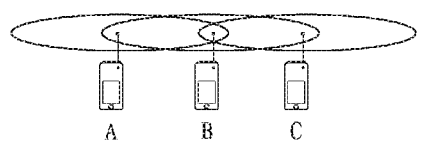
FIGS. 7 and 8 are views illustrating problems of a conventional collision resolution mechanism.
Figure 8:
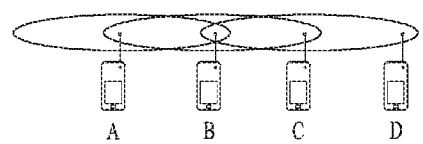

FIGS. 7 and 8 are view illustrating exemplary problems of a conventional collision resolution mechanism.

Specifically, FIG. 7 is a view illustrating hidden node issues. The present example shows a case that an STA A is communicating with an STA B and an STA C has information to be transmitted. Specifically, when the STA A transmits information to the STA B, since the STA C is out of transmission range of the STA A at the time of performing carrier sensing on a medium before transmitting data to the STA B, the STA C is unable to detect a signal transmitted by the STA A and there is a possibility that the medium is considered as being in an idle state. As a result, since the STA B receives information of the STA A and information of the STA C at the same time, a collision occurs. In this case, the STA A can be regarded as a hidden node of the STA C.

Meanwhile, FIG. 8 is a view illustrating exposed node issues. Currently, the STA B transmits data to the STA A. In this case, when the STA C performs carrier sensing, since the STA B is in a state of transmitting information, the carrier sensing shows a result that a medium is busy. As a result, although the STA C wants to transmit data to an STA D, since the media is sensed as busy, the STA C may unnecessarily wait until the medium becomes idle. In particular, although the STA A is located at the outside of a CS range of the STA C, the STA A may block information transmission of the STA C. In this case, the STA C becomes an exposed node of the STA B.

In order to make good use of a collision avoidance mechanism in the aforementioned situation, it may be able to introduce such a short signaling packet as RTS (request to send), CTS (clear to send), and the like. In particular, it may be able to use the short signaling packet to enable surrounding STAs to overhear whether or not two STAs transmit information. In particular, if an STA intending to transmit data transmits an RTS frame to an STA receiving the data, the receiving end STA can inform surrounding terminals that the receiving end STA is going to receive data by transmitting a CTS frame to the surrounding terminals.

Figure 9:
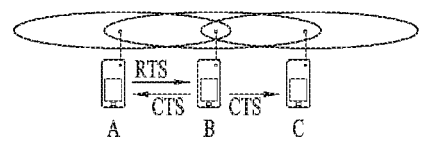
FIG. 9 is a view illustrating a mechanism for solving hidden node issues using a Request To Send/Clear To Send (RTS/CTS) frame.

FIG. 9 is a diagram for explaining a mechanism of solving a hidden node issue using an RTS/CTS frame.

Referring to FIG. 9, both the STA A and the STA C intend to transmit data to the STA B. If the STA A sends RTS to the STA B, the STA B sends CTS to both the STA A and the STA C located near the STA B. As a result, the STA C waits until data transmission between the STA A and the STA B is finished. By doing so, it is able to avoid a collision.

Figure 10:
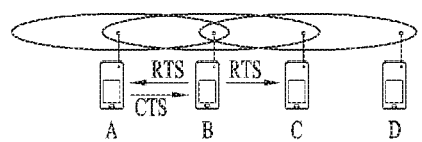
FIG. 10 is a view illustrating a mechanism for solving exposed node issues using an RTS/CTS frame.

FIG. 10 is a view illustrating a mechanism of solving an exposed node issue using an RTS/CTS frame.

Referring to FIG. 10, the STA C overhears RTS/CTS transmission between the STA A and the STA B. By doing so, although the STA C transmits data to a different STA D, the STA C is able to know that a collision does not occur. In particular, the STA B transmits RTS to all terminals located near the STA B and transmits CTS to the STA A only to which data is to be practically transmitted. Since the STA C receives the RTS and does not receive the CTS of the STA A, the STA C is able to know that the STA A is located at the outside of a CS range of the STA C.

Figure 11:
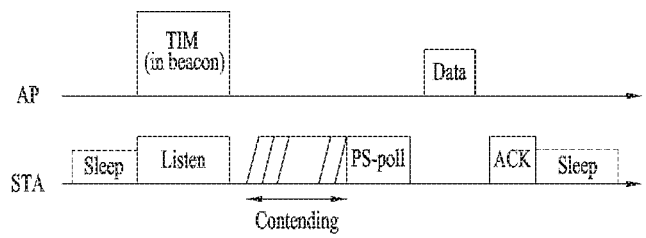
FIGS. 11, 12, and 13 are detailed views illustrating operations of a Station (STA) in response to reception of a Traffic Indication Map (TIM).
Figure 12:
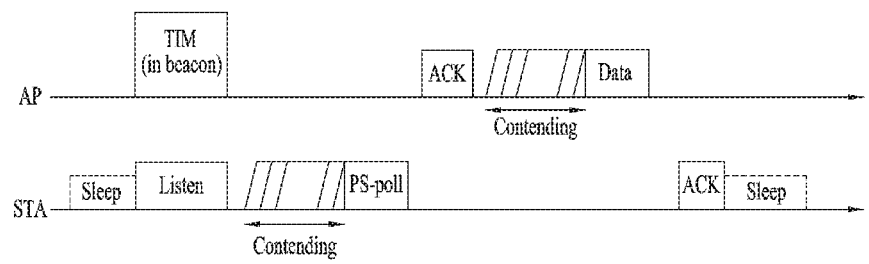
Figure 13:
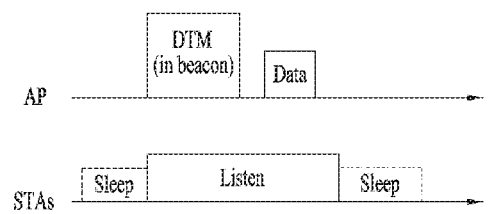
Figure 14:
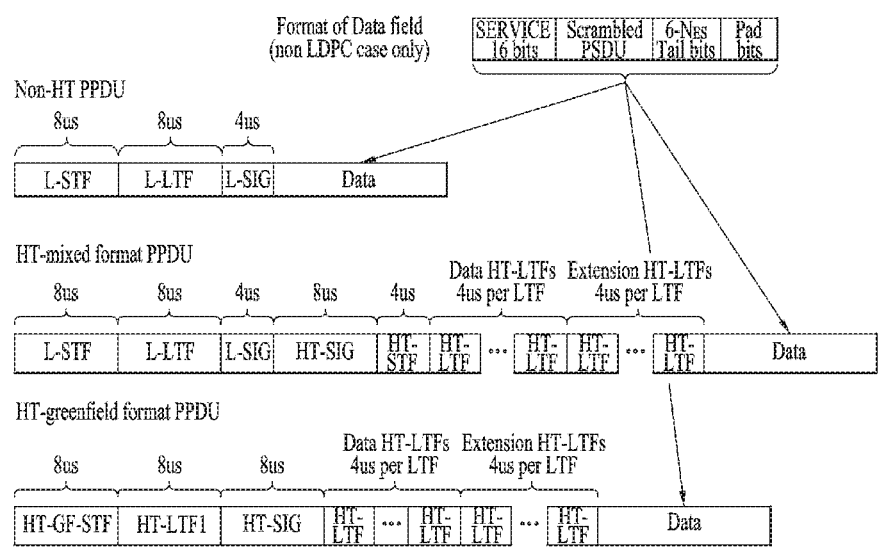

FIGS. 11 to 13 are views illustrating an operation of an STA which has received TIM.

Referring to FIG. 11, an STA switches to an awake state from a sleep state to receive a beacon frame including a TIM from an AP and interprets the received TIM element. By doing so, the STA is able to know there is a buffered traffic to be transmitted to the STA. The STA performs contending with other STAs to access a medium for transmitting a PS-poll frame and may be then able to transmit the PS-poll frame to request data frame transmission to the AP. Having received the PS-poll frame transmitted by the STA, the AP can transmit a frame to the STA. The STA receives a data frame and may be able to transmit a confirmation response (ACK) to the AP in response to the data frame. Subsequently, the STA can switch back to the sleep state.

As shown in FIG. 11, having received the PS-poll frame from the STA, the AP may operate according to an immediate response scheme that a data frame is transmitted after prescribed time (e.g., SIFS (short-inter-frame space)). Meanwhile, after the AP receives the PS-poll frame, if the AP fails to prepare a data frame to be transmitted to the STA during SIFS time, the AP may operate according to a deferred response scheme. Regarding this, it is explained in the following with reference to FIG. 12.

In the example shown in FIG. 12, similar to the example of FIG. 11, the STA switches to the awake state from the sleep state, receives a TIM from the AP, performs contending with other STAs, and transmits the PS-poll frame to the AP. If the AP fails to prepare a data frame during an SIFS after the PS-poll frame is received, the AP can transmit an ACK frame instead of the data frame to the STA. If the data frame is ready after the ACK frame is transmitted, the AP can transmit the data frame to the STA after contending is performed. The STA transmits an ACK frame to the AP to indicate that the data frame is successfully received and can switch back to the sleep state.

FIG. 13 illustrates an example in which the AP transmits a DTIM. Stations can switch to the awake state from the sleep state to receive a beacon frame including a DTIM element from the AP. Having received the DTIM, the STAs are able to know that a multicast/broadcast frame is to be transmitted. After the beacon frame including the DTIM is transmitted, the AP can immediately transmit data (i.e., the multicast/broadcast frame) without an operation of transmitting and receiving a PS-poll frame. Having received the beacon frame including the DTIM, the STAs receive data while continuously maintaining the awake state and may be able to switch back to the sleep state after the data reception is completed.

FIGS. 14 to 18 are views illustrating exemplary frame structures used in an IEEE 802.11 system.

An STA can receive a Physical Layer Convergence Protocol (PLCP) Packet Data Unit (PPDU). In this case, a PPDU frame format can be configured in a manner of including a Short Training Field (STF), a Long Training Field (LTF), a SIGnal (SIG) field, and a data field. In this case, as an example, the PPDU frame format can be configured based on a type of the PPDU frame format.

As an example, a non-High Throughput (non-HT) PPDU frame format can be configured by a Legacy-STF (L-STF) field, a Legacy-LTF (L-LTF) field, an SIG field, and a data field only.

And, the type of the PPDU frame format can be configured by either a HT-mixed format PPDU or a HT-greenfield format PPDU. In this case, the aforementioned PPDU format can further include an additional (a different type of) STF, LTF, and an SIG field between the SIG field and the data field.

Figure 15:
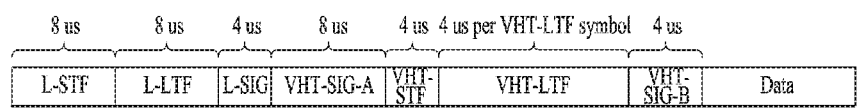

Referring to FIG. 15, it may be able to configure a Very High Throughput (VHT) PPDU format. In this case, the VHT PPDU format can also further include an additional (a different type of) STF, LTF, and an SIG field between the SIG field and the data field. More specifically, the VHT PPDU format can include at least one of a VHT-SIG-A field, a VHT-STF field, a VHT-LTF field, and a VHT-SIG-B field between the L-SIG field and the data field.

In this case, the STF may correspond to a signal for signal detection, Automatic Gain Control (AGC), diversity selection, minute time synchronization, and the like. And, the LTF may correspond to a signal for channel estimation, frequency error estimation, and the like. In this case, both the STF and the LTF can be referred to as a PCLP preamble. The PCLP preamble may correspond to a signal for OFDM physical layer synchronization and channel estimation.

Figure 16:
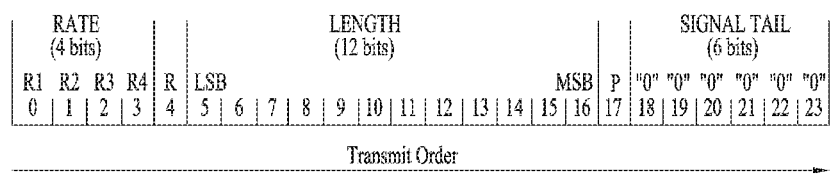

Referring to FIG. 16, the SIG field can include a RATE field, a LENGTH field, and the like. The RATE field can include information on modulation and a coding rate of a data. The LENGTH field can include information on a data length. In addition, the SIG field can include a parity bit, an SIG TAIL bit, and the like.

The data field can include a SERVIVE field, a PSDU (PLCP service data unit), a PPDU TAIL bit. If necessary, the data field can further include a padding bit.

Figure 17:
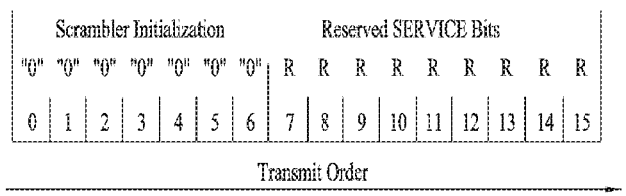

In this case, referring to FIG. 17, a partial bit of the SERVICE field can be used for synchronization of a descrambler in a receiving end and a partial bit can be configured by a reserved bit. The PSDU corresponds to a MAC Protocol Data Unit (PDU) defined in a MAC layer and can include data generated/used in a higher layer. The PPDU TAIL bit can be used for returning an encoder to a zero state. The padding bit can be used for matching a length of a data field with a prescribed unit.

And, as mentioned in the foregoing description, the VHT PPDU format can include an additional (or a different type of) STF, LTF, and an SIG field. In this case, L-STF, L-LTF, and L-SIG may correspond to a part of non-VHT in the VHT PPDU. In this case, VHT-SIG A, VHT-STF, VHT-LTF, and VHT-SIG may correspond to a part of VHT in the VHT PPDU. In particular, a field for the non-VHT and a region for the VHT field can be respectively defined in the VHT PPDU. In this case, as an example, the VHT-SIG A can include information for interpreting the VHT PPDU.

In this case, as an example, referring to FIG. 18, the VHT-SIG A can be configured by VHT SIG-A1 (FIG. 18 (a)) and VHT SIG-A2 (FIG. 18 (b)). In this case, each of the VHT SIG-A1 and the VHT SIG-A2 can be configured by 24 data bits and the VHT SIG-A1 can be transmitted prior to the VHT SIG-A2. In this case, the VHT SIG-A1 can include a BW field, an STBC field, a group ID field, an NSTS/partial AID field, a TXOP_PS_NOT_ALLOWED field, and a reserved field. And, the VHT SIG-A2 can include a short GI field, a short GI NSYM disambiguation field, an SU/MU[0] coding field, an LDPC extra OFDM symbol field, an SU VHT-MCS/MU[1-3] coding field, a beamformed field, a CRC field, a tail field, and a reserved field. Through the aforementioned fields, it may be able to check information on the VHT PPDU.

FIGS. 19, 20, and 21 are views illustrating a MAC frame format.

An STA may receive a PPDU in one of the above-described PPDU formats. A PSDU in a data part of the PPDU frame format may include a MAC PDU. The MAC PDU may be defined in various MAC frame formats, and a basic MAC frame may include a MAC header, Frame Body, and Frame Check Sequence (FCS).

For example, referring to FIG. 19, the MAC header may include Frame Control, Duration/ID, Addresses, Sequence Control, QoS Control, and HT Control. In the MAC header, the Frame Control field may include control information required for frame transmission/reception. The Duration/ID field may be set to a time required to transmit the frame. The Address fields may include identification information about a transmitter and a receiver, which will be described later. For the Sequence Control, QoS Control, and HT Control fields, refer to the IEEE 802.11 standard specifications.

For example, the HT Control field may be configured in two types, HT variant and VHT variant, and include different information according to the types. Referring to FIGS. 20 and 21, a VHT subfield of the HT Control field may indicate whether the HT Control field is the HT-variant type or the VHT-variant type. For example, if the VHT subfield is set to '0', the HT Control field may be the HT-variant type, and if the VHT subfield is set to '1', the HT Control field may be the VHT-variant type.

For example, referring to FIG. 20, if the HT Control field is the HT-variant type, the HT Control field may include Link Adaptation Control, Calibration Position, Calibration Sequence, CSI/Steering, HT NDP Announcement, AC constraint, RDG/More PPDU, and Reserved fields. For example, referring to (b) of FIG. 20, the Link Adaptation Control field may include TRQ, MAI, MFSI, and MFB/ASELC. For more details, refer to the IEEE 802.11 standard specifications.

For example, referring to FIG. 21, if the HT Control field is the VHT-variant type, the HT Control field may include MRQ, MSI, MFSI/GID-LM, MFB GID-H, Coding Type, FB Tx Type, Unsolicited MFB, AC constraint, RDG/More PPDU, and Reserved fields. For example, referring to (b) of FIG. 21, the MFB field may include VHT N_STS, MCS, BW, and SNR. For more details, refer to [Table 1] and the IEEE 802.11 standard specifications.

TABLE 1

| Subfield | Meaning | Definition |
| --- | --- | --- |
| MRQ | MCS request | Set to 1 to request MCS feedback (solicited MFB), otherwise set to 0. |
| MSI | MRQ sequence identifier | When the MRQ subfield is set to 1, the MSI subfield contains a sequence number in the range 0 to 6 that identifies the specific request. When the MRQ subfield is set to 0, the MSI subfield is reserved. |
| MFSI/GID-L | MFB sequence identifier/LSB of Group ID | If the Unsolicited MFB subfield is set to 0, the MFSI/GID-L subfield contains the received value of MSI contained in the frame to which the MFB information refers.<br>If the Unsolicited MFB subfield is set to 1, the MFSI/GID-L subfield contains the lowest 3 bits of Group ID of the PPDU to which the unsolicited MFB refers. |
| MFB | VHT N_STS, MCS, BW and SNR feedback | MFB subfield is interpreted as defined in Table 8-ac2 (MFB subfield in the VHT format HT Control field). This subfield contains the recommended MFB. The value of MCS = 15 and VHT N_STS = 7 indicates that no feedback is present. |
| GID-H | MSB of Group ID | If the Unsolicited MFB subfield is set to 1, the GID-H subfield contains<br>the highest 3 bits of Group ID of the PPDU to which the unsolicited MFB refers.<br>Otherwise this subfield is reserved. |
| Coding Type | Coding type of the MFB response | If the Unsolicited MFB subfield is 1, the Coding Type subfield contains the Coding information (set to 0 for BCC and set to 1 for LDPC) to which the unsolicited MFB refers.<br>Otherwise, this subfield is reserved. |
| FB Tx Type | Transmission type of MFB response | If the Unsolicited MFB subfield is set to 1 and<br>FB Tx Type subfield is set to 0, the unsolicited MFB refers to either an unbeamformed VHT PPDU or transmit diversity using an STBC VHT PPDU.<br>If the Unsolicited MFB subfield is set to 1 and the FB Tx Type subfield is set to 1, the unsolicited MFB refers to a beamformed SU-MIMO VHT PPDU.<br>Otherwise this subfield is reserved. |
| Unsolicited MFB | Unsolicited MCS feedback indicator | Set to 1 if the MFB is not a response to an MRQ.<br>Set to 0 if the MFB is a response to an MRQ. |
| AC Constraint | | As described in AC Constraint field in 8.2.4.6.2 (HT format). |
| RDG/More PPDU | | As described in RGD/More PPDU field in 8.2.4.6.2 (HT format). |

FIG. 22 is a view illustrating a Short MAC frame format. A MAC frame may be configured as a Short MAC frame by reducing unnecessary information when needed, to prevent waste of radio resources. For example, referring to FIG. 22, the MAC header of a Short MAC frame may always include a Frame Control field, an A1 field, and an A2 field. The MAC header may selectively include a Sequence Control field, an A3 field, and an A4 field. Since information unnecessary for a MAC frame is not included in a Short MAC frame in this manner, radio resources may be conserved.

For example, the Frame Control field of the MAC header may include Protocol Version, Type, PTID/Subtype, From DS, More Fragment, Power Management, More Data, Protected Frame, End of Service Period, Relayed Frame, and Ack Policy. For a description of each subfield of the Frame Control field, refer to the IEEE 802.11 standard specifications.

Meanwhile, the Type field of the Frame Control field in the MAC header may be defined as illustrated in [Table 2]. The Type field may be 3 bits with value 0 to value 3 providing address information and value 4 to value 7 being reserved. New address information may be provided using the reserved values in the present disclosure, which will be described later.

TABLE 2

| Type | Type description |
|---|---|
| 0 | Data<br>Either A1 or A2 is an SID (defined in 8.8.3.2 (Address fields)), as determined by the From DS field in the Frame Control field |
| 1 | Management<br>Either A1 or A2 is an SID (defined in 8.8.3.2 (Address fields)), as determined by the From DS field in the Frame Control field<br>Both A1 and A2 fields contain MAC addresses for Short Probe Response frames. |
| 2 | Control<br>A1 is an SID and A2 is either an SID or contains a MAC address. |
| 3 | Data<br>Both A1 and A2 fields contain MAC addresses |

TABLE 2-continued

| Type | Type description |
|---|---|
| 4-6 | Reserved |
| 7 | Extension (currently reserved) |

In the Frame Control field of the MAC header, the From DS field may be 1 bit, as defined in [Table 3]. The present disclosure is applicable to the From DS field, which will be described later.

TABLE 3

| From DS field | Meaning | Use |
|---|---|---|
| 0 | A1 contains the MAC address of the receiver<br>A2 is an SID which contains the AID of the transmitter<br>A2 contains the MAC address of the transmitter for Short Data frames with Type field equal to 3<br>A3 (if present) contains the MAC address of the destinations<br>A4 (if present) contains the MAC address of the source | For frames transmitted by a non-AP STA to an AP<br>For frames transmitted form a non-AP STA to non-AP STA (direct link) |
| 1 | A1 is an SID which contains the AID of the receiver<br>A1 contains the MAC address of the receiver for Short Data frames wtih Type field equal to 3<br>A2 is the MAC address of the transmitter<br>A3 (if present) contains the MAC address of the destination<br>A4 (if present) contains the MAC address of the source | AP to non-AP STA |

Each of the More Fragment, Power Management, More Data, Protected Frame, End of Service Period, Relayed Frame, and Ack Policy fields may be configured in 1 bit. The Ack Policy field may provide ACKnowledgement/Negative ACKnowledgement (ACK/NACK) information in 1 bit, and each value of the Ack Policy field may be defined as listed in [Table 4]. For more details, refer to the IEEE 802.11 standard specifications.

TABLE 4

| Ack Policy field | Meaning |
|---|---|
| 0 | Normal Ack or Implicit Block Ack Request.<br>In a Short frame that is a non-A-MPDU frame or VHT single MPDU where neither<br>the originator nor the addressed recipient support Fragment BA procedure::<br>The addressed recipient returns as Ack frame after a short interfame space (STFS)<br>period, according to the procedures defined in 0.3.2.9 (Ack procedure).<br>In a Short frame that is part of an A-MPDU that is not a VHT single MPDU:<br>The addressed recipient returns a BlockAck frame, either individually or as part of<br>an A-MPDU starting a SIFS after the PPDU carrying the frame, according to the<br>procedure defined in 9.3.2.9 (Block Ack procedure), 9.23.7.5 (Generation and<br>transmission of BlockAck frames by an HT STA, or IPMG STA or SIG STA),<br>and<br>9.22.8.3 (Operation of HT-delayed Block Ack).<br>In a Short frame that is a fragment:<br>When both the originator and the addressed recipient support the Fragment BA<br>procedure, the addressed recipient returns an NDP BlockAck fame after a SIFS,<br>according to the procedure defined in 9.3.2.10s (Fragment BA procedure).<br>Ack Policy 0 is limited to at most one MU recipient per MU PPDU. |

TABLE 4-continued

| Ack Policy field | Meaning |
|---|---|
| 1 | No Ack or Block Ack Policy.<br>In a Short frame that is a non-A-MPDU frame of VHT angle MPDU:<br>The addressed recipient takes no action upon receipt of the frame. More details are<br>provided in 9.23 (No Acknowledgment (No Ack)). The Ack Policy subfield is set so<br>this value as all individually addressed frames in which the sender does not require<br>acknowledgement. The Ack Policy subfield is also set to this value in all group addressed frames. This combination is not used for Short Data frames with a TID for which a Block Ack agreement exists.<br>In a Short frame that is part of an A-MPDU frame that is not a VHT single MPDU:<br>The addressed recipient takes no action upon the receipt of the frame except for recording the state. The recipient can expect a BlockAckReq frame in the future to which it responds using the procedure described in 9.23 (Block acknowledgment (block ack)). |

Regarding STAs using a frame constructed in the above-described format, an AP VHT STA may support a non-AP VHT STA operating in a Transmit Opportunity (TXOP) power save mode in a BSS. For example, the non-AP VHT STA may operate in the TXOP power save mode in an awake state. The AP VHT STA may switch the non-AP VHT STA to a doze state during a TXOP. For example, the AP VHT STA may command the non-AP VHT STA to switch to the doze state by transmitting a VHT PPDU with a TXVECTOR parameter, TXOP_PS_NOT_ALLOWED set to 0. Parameters in TXVECTOR transmitted along with the VHT PPDU by the AP VHT STA may be changed from 1 to 0 and maintained during the TXOP. Therefore, power may be saved during the remaining TXOP.

On the contrary, if TXOP_PS_NOT_ALLOWED is set to 1 and thus power saving is not performed, the parameters in TXVECTOR may be kept unchanged.

For example, as described before, the non-AP VHT STA may switch to the doze state in the TXOP power save mode during a TXOP, if the following conditions are satisfied.

A VHT MU PPDU is received, and the STA is not indicated as a group member by an RXVECTOR parameter, Group_ID.

An SU PPDU is received, and an RXVECTOR parameter, PARTIAL_AID is not 0 or does not match the partial AID of the STA.

Although the STA determines that the RXVECTOR parameter, PARTIAL_AID matches the partial AID of the STA, a receiver address of the MAC header does not match the MAC address of the STA.

Although the RXVECTOR parameter, Group_ID indicates that the STA is a group member, an RXVECTOR parameter, NUM_STS is set to 0.

A VHT NDP Announcement frame is received, and the RXVECTOR parameter, PARTIAL_AID is set to 0 and does not match the AID of an Info field for the STA.

The STA receives a frame with More Data set to 0 and Ack Policy set to No Ack, or transmits an ACK with Ack Policy set to a value other than No Ack.

The AP VHT STA may include a Duration/ID value set to the remaining TXOP interval and a NAV-SET Sequence (e.g., Ready To Send/Clear To Send (RTS/CTS)). Herein, the AP VHT STA may not transmit a frame to the non-AP VHT STA switching to the doze state based on the above-described conditions during the remaining TXOP.

For example, if the AP VHT STA transmits a VHT PPDU with the TXVECTOR parameter, TXOP_PS_NOT_ALLOWED set to 0 in the same TXOP and does not want the STA to switch from the awake state to the doze state, the AP VHT STA may not transmit a VHT SU PPDU.

For example, the AP VHT STA may not transmit a frame to a VHT STA that has switched to the doze state before timeout of a NAV set at the start of a TXOP.

If the AP VHT STA fails to receive an ACK after transmitting a frame including at least one of a MAC Service Data Unit (MSDU), an Aggregated-MSDU (A-MSDU), and a MAC Management Protocol Data Unit (MMPDU), with More Data set to 0, the AP VHT STA may retransmit the frame at least once in the same TXOP. For example, if the AP VHT STA fails to receive an ACK for a retransmission in the last frame of the same TXOP, the AP VHT STA may retransmit the frame after waiting until the next TXOP.

For example, the AP VHT STA may receive a Block Ack frame from a VHT STA operating in the TXOP power save mode. The Block Ack frame may be a response to an A-MPDU including an MPDU with More Data set to 0. Herein, the AP VHT STA is in the doze state and may not receive a response to the sub-sequence of a retransmitted MPDU during the same TXOP.

Further, a VHT STA that has operated in the TXOP power save mode and switched to the doze state may activate a NAV timer while it stays in the doze state. For example, upon expiration of the timer, the VHT STA may transition to the awake state.

Further, the STA may contend for medium access, upon expiration of the NAV timer.

Figure 23:
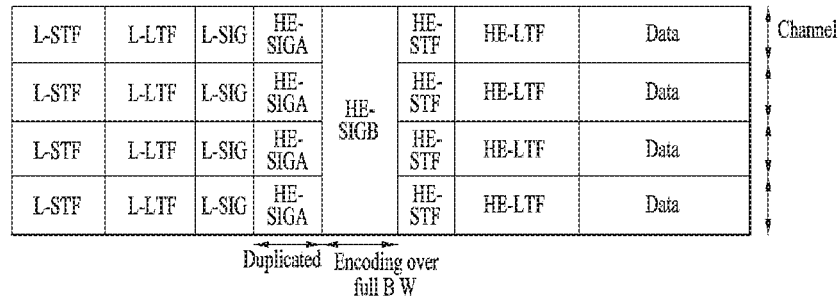
FIG. 23 is a view illustrating exemplary Physical layer Protocol Data Unit (PPDU) formats.

FIG. 23 is a view illustrating exemplary PPDU formats. As described before, various PPDU formats are available. For example, a new PPDU format may be provided. A PPDU may include L-STF, L-LTF, L-SIG, and DATA fields. For example, the PPDU frame may further include HE-SIG A, HE-STF, HE-LTF, and HE-SIG B fields. The HE-SIG A field may include, for example, common information. For example, the common information may include Bandwidth, Guard Interval (GI), Length, BSS Color, and so on. For example, an L part (L-STF, L-LTF, and L-SIG) may be transmitted in a Single Frequency Network (SFN) mode on a 20-MHz basis in the frequency domain. For example, like the L part, the HE-SIG A field may be transmitted in the SFN mode on a 20-MHz basis. For example, if a channel has a bandwidth larger than 20 MHz, the L part and the HE-SIG A field may be duplicated on a 20-MHz basis and then transmitted. The HE SIG-B field may provide user-specific information. For example, the user-specific information may include an STA AID, resource allocation information (e.g., an allocation size), an MCS, $N_{sts}$, coding, STBC, TXBF, and so on. Further, the HE SIG-B field may be transmitted across a total bandwidth.

For example, referring to (b) of FIG. 23, a PPDU may be transmitted in an 80-MHz band. The L part and the HE-SIG A field may be duplicated on a 20-MHz basis and then transmitted, and the HE-SIG B field may be transmitted across the total 80-MHz band. However, the transmission scheme may be purely exemplary, not limited to the above embodiment.

Figure 24:
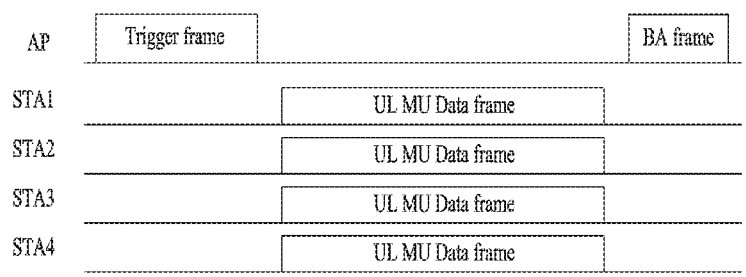
FIG. 24 is a view illustrating a method for performing Uplink Multi-User (UL MU) transmissions at an Access Point (AP) STA and non-AP STAs.

FIG. 24 is a view illustrating a method for performing Uplink Multi-User (UL MU) transmissions at an Access Point (AP) STA and non-AP STAs.

As described before, an AP may acquire a TXOP for medium access, occupy a medium by contention, and transmit a signal during the TXOP. Referring to FIG. 24, an AP STA may transmit a trigger frame to a plurality of STAs, for UL MU transmissions. For example, the trigger frame may provide UL MU allocation information including information about a resource allocation position and size, the IDs of STAs, an MCS, and an MU type (=MIMO or OFDMA). That is, the AP STA may transmit the trigger frame to the plurality of STAs so that the STAs may transmit UL data. For example, the plurality of STAs may transmit data in a format indicated by the trigger frame to the AP after an SIFS. Then, the AP may transmit ACK/NACK information to the STAs and thus the STAs may perform UL MU transmissions.

Figure 25:
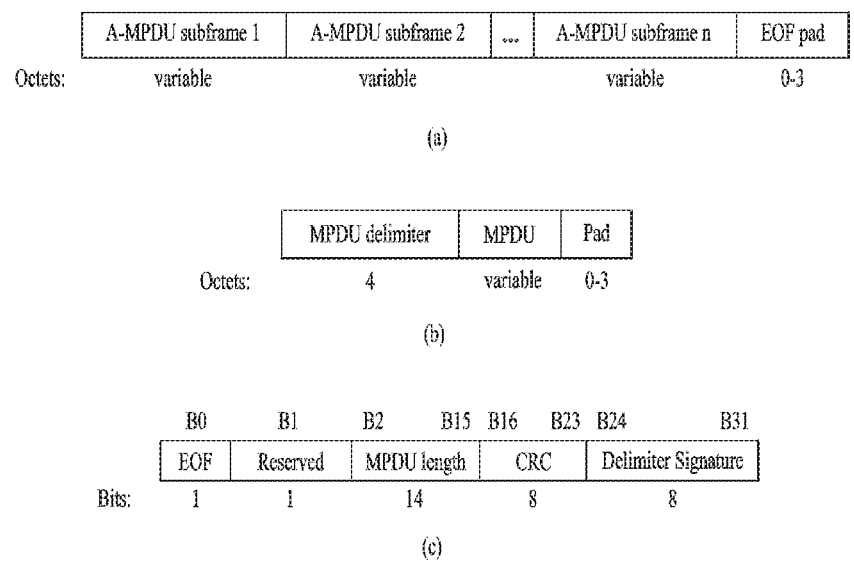
FIG. 25 is a view illustrating an Aggregate-MAC Protocol Data Unit (MPDU) (A-MPDU) frame structure for UL MU transmission.

FIG. 25 is a view illustrating an Aggregate-MPDU (A-MPDU) for UL MU transmission. In UL MU transmission, each of a plurality of STAs may receive resource allocation information for the STA, and the STAs may transmit data at the same time based on the received resource allocation information. For this purpose, an A-MPDU format may be used. More specifically, referring to FIG. 25(a), an A-MPDU may include a plurality of A-MPDU subframe fields and an End Of Frame (EOF) pad field. Each A-MPDU subframe may carry information about one of the STAs. For example, referring to FIG. 25(b), an A-MPDU subframe may include MPDU delimiter, MPDU, and PAD fields. For example, referring to FIG. 25(c), the MPDU delimiter field may include EOF, MPDU length, CRC, Delimiter Signature, and Reserved fields. For example, each field included in the MPDU delimiter field may be configured as illustrated in [Table 5].

For example, the EOF field may be configured in 1 bit. The EOF field may indicate whether the A-MPDU subframe is the end of the frame. For example, if the MPDU length field is set to 0 and the EOF field is set to 1 for the A-MPDU subframe, the A-MPUD subframe may not precede another A-MPDU subframe with an EOF set to 0. In other words, an A-MPUD subframe with an MPDU length set to 0 and an EOF set to 1 may be the last A-MPDU subframe of a frame.

The MPDU length field may indicate the length of the MPDU. If the MPDU length field is set to 0, this may indicate the absence of an MPDU. For example, an A-MPDU subframe with an MPDU length field set to 0 may be used to indicate a starting or ending frame.

The Delimiter Signature field may be formed in an independent pattern to search for an MPDU delimiter. That is, the Delimiter Signature field may be used to identify an A-MPDU subframe.

TABLE 5

| Field | Size (bite) | Description |
| --- | --- | --- |
| EOP | 1 | End of frame indication. Set to 1 in an A-MPDU subframe that has 0 in the MPDU Length field and that is used to pad the A-MPDU in a VHT PPDU as described in 9.15.8 (A-MPDU padding for VHT PPDU). Set to 1 in the MPDU delimiter of a VET single MPDU as described in 9.13.7 (Setting the EOF field of the MPDU delimiter). Set to 0 otherwise. |
| Reserved | 1 | |
| MPDU length | 14 | Length of the MPDU in octets. Set to 0 if no MPDU is present. An A-MPDU subframe with 0 in the MPDU Length field is used as defined in 9.13.3 (Minimum MPDU Start Spacing field) to meet the minimum MPDU start spacing requirement and also to pad the A-MPDU to fill the available octets in a VHT PPDU as defined in 9.13.6 (A-MPDU padding for VHT PPDU). |
| CRC | 8 | 8-bit CRC of the preceding 16-bits |
| Delimiter Signature | 8 | Pattern that may be used to detect an MPDU delimiter when scaning for an MPDU delimiter. The unique pattern is set to the value 0x4E (see NOTE below). |

NOTE
The ASCII value of the character 'N' was chosen as the unique pattern for the value in the Delimiter Signature field.

Now, a description will be given of a specific embodiment of the present disclosure for increasing the efficiency of radio resources in a MAC frame.

FIG. 26 is a view illustrating a MAC frame structure based on UL MU. As described before, an STA may receive a PPDU. The STA may decode a MAC frame in the PPDU, determine whether the MAC frame is directed to the STA by checking an address field in the MAC header of the MAC frame, and determine whether to discard the MAC frame body of the MAC frame according to the determination. That is, the STA may receive its allocated information using information included in the address field. For example, the STA may decode the MAC frame based on a SIG field of the PPDU. For example, the SIG field may be an L-SIG or HT-SIG field. The MAC frame may be an MPDU or an A-MPDU, not limited to the foregoing embodiment.

The SIG field of the PPDU may include Partial AID information. For example, if the STA supports TXOP power saving, the STA checks a Partial AID. If the Partial AID does not match the Partial AID of the STA, the STA may perform power saving during a TXOP. On the contrary, if the Partial AID matches the Partial AID of the STA, the STA may decode the remaining part of the PPDU, and determine whether the frame is for the STA by checking the address field of the MAC header. If the frame is not for the STA, the STA may discard the MAC frame body. For example, the SIG field may be a VHT-SIG A field, not limited to the foregoing embodiment.

As described above, the STA may determine whether the frame is for the STA based on the address field of the MAC header. That is, the MAC header may necessarily include a receiver address. For example, the SIG field may include an independent AID for each STA within a BSS, for OFDMA allocation. For example, if an AP transmits a DL MU frame to STAs, a SIG field of the DL MU frame may include IDs of the STAs (e.g., MAC addresses, AIDs, or Partial AIDs of the STAs). In another example, if an AP STA transmits a trigger frame to support UL MU, the trigger frame may include IDs of STAs to be allocated to UL MU resources in a BSS (e.g., MAC addresses, AIDs, or Partial AIDs of the STAs). Resource allocation information for the STAs as included in the trigger frame may be included in the SIG field of a PHY header or in a MAC frame.

That is, since a receiver address is already included in another field (e.g., SIG) of the PPDU, the receiver address included in the MAC header is redundant, thereby wasting radio resources. For example, a receiver address may be included redundantly in the MAC header of a DL OFDMA MAC frame, or a transmitter address may be included redundantly in the MAC header of a UL OFDMA MAC frame, thereby wasting radio resources. Particularly, the overhead of the MAC header increases in a small packet such as a Voice over Internet Protocol (VoIP) packet, thus causing problems.

For example, referring to FIG. 26, if identification information (or address information) about a non-AP STA is included in another field of a PPDU, only one of a first address field and a second address field may be included in a MAC header. For example, the identification information about the non-AP STA may be an AID or a Partial AID. Another field of the PPDU may be a SIG field which has been described before. A MAC frame format including only one of the first and second address fields may be used in, but not limited to, MU transmission such as OFDMA or MU-MIMO, or short MAC frame transmission.

For example, the first address field of the MAC header may provide receiver information. Further, the second address field of the MAC header may provide transmitter information. For example, the MAC frame format illustrated in (a) of FIG. 26 may be used for UL. For example, identification information about a non-AP STA may be included in another field (e.g., SIG) of the PPDU. Therefore, the MAC frame format may include only the first address field. That is, the identification information about the non-AP STA as transmitter information is included in another field of the PPDU, and thus the second address field indicating transmitter information may not be included in the MAC frame format.

To further generalize the above description, the MAC frame format illustrated in (b) of FIG. 26 may include only one of the first and second address fields. On DL, only the second address field may be included. On UL, identification information about a non-AP STA is transmitter information and thus only the first address field may be included as receiver information. The resulting deletion of an unnecessary field in a MAC header may increase the efficiency of radio resources. For example, the above MAC frame may be, but not limited to, a HE MAC frame.

FIG. 27 is a view illustrating MAC frame formats based on an indicator. Referring to FIG. 27, a MAC header may include a Frame Control field. It may be indicated by the Frame Control field whether a corresponding frame is a MAC frame including only one of first and second address fields. It may also be indicated by the Frame Control field whether the frame is a DL or UL frame. For example, the Frame Control field may include a Protocol Version field. The Protocol Version field may indicate whether the frame is a HE MAC frame. For example, the Protocol Version field may indicate whether the frame is an OFDMA frame or a Short MAC frame. That is, it may be indicated by the Protocol Version field whether the frame is a MAC frame including only one of the first and second address fields, and the foregoing embodiment does not limit the present disclosure.

Further, the Control Frame field may include a Type field. The Type field may be configured in 3 bits, with values 0 to 3 indicating address information and values 4 to 7 being reserved, as illustrated in [Table 2]. It may be indicated by one of the reserved bits of the Type field whether the frame is a MAC frame including only one of the first and second address fields.

More specifically, referring to [Table 6] below, if the Type field is set to 0, one of first and second addresses may be a Short ID (SID), determined by a From DS field. The From DS field may be configured based on DL or UL transmission. That is, if the Type field is set to 0, one of receiver and transmitter addresses may be set as an address identifying a non-AP STA based on DL or UL transmission. If the Type field is set to 1, one of the first and second addresses may be an SID. If the Type field is set to 1, both the first and second addresses may include MAC addresses. If the Type field is set to 2, the first address may be an SID and the second address may include one of an SID and a MAC address. If the Type field is set to 3, both the first and second addresses may include MAC addresses.

As described above, values 4 to 7 of the Type field may be reserved, and it may be indicated by one of the reserved values that only one of the first and second addresses is included in the MAC frame.

The Type field may be extended to 3 or more bits, and it may be indicated by one of extended reserved values that only one of the first and second addresses is included in the MAC frame, as in the present disclosure. In other words, it may be indicated by one of the reserved values that only one of the first and second addresses is included in the MAC frame, and the foregoing embodiment does not limit the present disclosure.

While it is indicated by one of the reserved values of the Type field, 4 that only one of the first and second addresses is included in the MAC frame in [Table 6], which should not be construed as limiting the present disclosure, the same thing may be indicated by one of the other reserved values, 5, 6 or 7. If the Type field is extended, it may be indicated by one of the reserved values of the extended Type field that only one of the first and second addresses is included in the MAC frame.

Referring to [Table 6], if the Type field is set to 4, only one of the first and second addresses may be included in the MAC frame as in the present disclosure. As stated before, 4 is an exemplary value and thus any other reserved value of the Type field is also available.

For example, if the Type field is 4 (one of the reserved values), it may be determined which one between the first and second addresses is to be included based on the value of the From DS field. For example, if UL is supported based on the From DS field, only the first address field may be included to indicate a receiver address. On the contrary, if DL is supported based on the From DS field, only the second address field may be included to indicate a transmitter address.

It may be indicated by one of the reserved values of the Type field that the frame is a HE MAC frame, an OFDMA MAC frame, or a Short MAC frame. That is, the type of a MAC frame including only one of the first and second addresses may be defined by one of the reserved values of the Type field, and the present disclosure is not limited by the above-described embodiment.

TABLE 6

| Type | Type description |
|---|---|
| 0. | Data<br>Ether A1 or A2 is an SID (defined in 8.8.3.2 (Address fields)), as determined by the From DS field in the Frame Control field. |

TABLE 6-continued

| Type | Type description |
|---|---|
| 1. | Management<br>Either A1 or A2 is an SID (defined in 8.8.3.2 (Address fields)), as determined by the From DS field in the Frame Control field. Both A1 and A2 fields contain MAC addresses for Short Probe Response frames. |
| 2. | Control<br>A1 is an SID and A2 is either an SID or contains a MAC address. |
| 3. | Data<br>Both A1 and A2 fields contain MAC addresses. |
| 4. | Data (Short Data frame only one between transmitter MAC address and receiver MAC address).<br>Only one between A1 and A2 is included in this frame (i.e., The other is not present) and it contains a MAC address. Which address is included depends on value of 'From DS subfield' (If From DS is 0 (UL), only A1 is included and otherwise, only A2 is included). |
| 5-6. | Reserved |
| 7. | Extension(Currently reserved). |

The Frame Control field may further include the From DS field. As described before with reference to [Table 3], the From DS field may be 1 bit long. The From DS field may be defined as illustrated in [Table 7] by applying the present disclosure. More specifically, if a frame is transmitted from a non-AP STA to an AP STA or a non-AP STA, the From DS field may be set to 0. That is, if the frame is transmitted on UL, the From DS field may be set to 0. For example, if the afore-described Type field is 4 (one of the reserved values), the MAC frame may include the first address as a receiver address without the second address as a transmitter address. On the contrary, if a frame is transmitted from an AP STA to a non-AP STA, the From DS field may be set to 1. That is, if the frame is transmitted on DL, the From DS field may be set to 1. For example, if the afore-described Type field is 4 (one of the reserved values), the MAC frame may include the second address as a transmitter address without the first address as a receiver address. That is, as described before, redundant information which is identification information about the non-AP STA may not be included, which may be indicated by each field included in the Frame Control field. That is, the above-described fields may be used as an indicator.

TABLE 7

| From DS field | Meaning | Use |
|---|---|---|
| 0. | A1 contains the MAC address of the receiver A2 is an SID which contains the AID of the transmitter.<br>A2 contains the MAC address of the transmitter for Short Data frames with Type field equal to 3.<br>A3 (if present) contains the MAC address of the destination.<br>A4 (if present) contains the MAC address of the source.<br>If Type field is set to 4, A1 contains the MAC address of the receiver and A2 is not present. | For frames transmitted by a non-AP STA to an AP.<br>For frames transmitted from a non-AP STA to non-AP STA (direct link). |
| 1. | A1 is an SID which contains the AID of the receiver.<br>A1 contains the MAC address of the receiver for Short Data frames with Type field equal to 3.<br>A2 is the MAC address of the transmitter.<br>A3 (if present) contains the MAC address of the destination. | AP to non-AP STA. |

TABLE 7-continued

| From DS field | Meaning | Use |
|---|---|---|
| | A4 (if present) contains the MAC address of the source.<br>If Type field is set to 4, A2 contains the MAC address of the transmitter and A1 is not present. | |

Indicating which address is included in a frame by the Type field and the From DS field of the Frame Control field is a mere example, and the indication may be made in a different manner. For example, a similar indication may be made by means of the Type/Subtype field and the To DS and From DS fields of the Frame Control field of a legacy (e.g., 11ac) MAC header. Or the indication may be made by means of another subfield of the Frame Control field or a field (e.g., the Duration/ID field) following the Frame Control field.

For example, referring to (a) and (b) of FIG. 27, if a DL frame is transmitted based on the Frame Control field of a MAC header, only the second address field indicating a transmitter address may be included in the MAC header. For example, the transmitter address may be a BSSID. Referring to (c) of FIG. 27, if a UL frame is transmitted based on the Frame Control field of a MAC header, only the first address field indicating a receiver address may be included in the MAC header. For example, the receiver address may be a BSSID.

Figure 28:
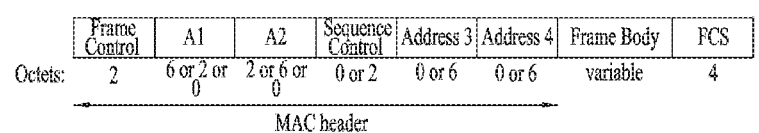
FIG. 28 is a view illustrating a configuration of fields included in a MAC header of a MAC frame.

FIG. 28 is a view illustrating a configuration of fields included in a MAC header of a MAC frame. Referring to FIG. 28, the MAC header may include a Frame Control field, a first address (A1) field, a second address (A2) field, a Sequence Control field, a third address (A3) field, a fourth address (A4) field, a Frame Body, and an FCS field. For example, the third address field may indicate a source address, and the fourth address field may indicate a destination address. Each of the third and fourth address fields may be 0 or 6 octets. If the address field is 0 octet, this may mean that the address field is not defined. That is, the third and fourth address fields may be included optionally in the MAC header.

For example, each of the first and second address fields may be 0, 2, or 6 octets. That is, the first and second address fields may also be included optionally in the MAC header. For example, only one of the first and second address fields may be included, as described before. That is, if the first address field is 0 octet, the second address field may be 2 or 6 octets. If the second address field is 0 octet, the first address field may be 2 or 6 octets.

Figure 29:
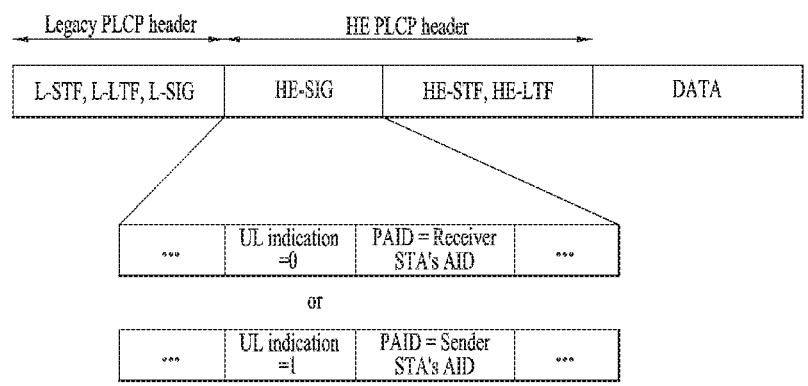
FIG. 29 is a view illustrating a method for including identification information about an STA in a PPDU.

FIG. 29 is a view illustrating a method for including identification information about an STA in a PPDU. An STA may receive a PPDU. As descried before, the PPDU may include an L part and an additional part. The additional part may be, for example, a HE-SIG, a HE-STF, and a HE-LTF. However, these parts may be modified, not limited to the above embodiment. As described before, the MAC header may include only one of the first and second address fields. Information of a field which is not included in the MAC header may be included in another field of the PPDU. For example, another field of the PPDU may be a SIG field. The SIG field may be, for example, a HE-SIG field. That is, address information as identification information about the STA that is not included in the MAC header may be included in the SIG field. The SIG field may include, for example, an indicator indicating whether the frame is a frame for UL transmission. For example, if the indicator is 0, this may indicate that the frame is for DL transmission. The AID or Partial AID of an STA may be included as identification information about a receiver in the SIG field. Also, if the indicator is 1, this may indicate that the frame is a frame for UL transmission. The AID or Partial AID of an STA may be included as identification information about a transmitter in the SIG field. That is, address information that is not included in the MAC header may be included in the SIG field based on the indicator.

For example, if a Partial AID indicated by the SIG field is identification information about an STA in a corresponding BSS, the size of the Partial AID may be variable. Further, the Partial AID or AID of the STA indicated by the SIG field may be represented in a different form, to thereby indicate the STA in the BSS. For example, the Partial AID or AID may be represented using a Group ID and an AID bitmap structure corresponding to the Group ID. If up to 8 STAs may be accommodated by each Group ID (GID), an AID bitmap may be 8 bits, each indicating a specific STA. Accordingly, an STA may determine a resource unit carrying a frame directed to the STA by a Group ID and an AID bitmap.

FIG. 30 is a view illustrating another MAC frame structure based on UL MU. In UL MU in which data is received from a plurality of STAs on UL, an AP STA may transmit a trigger frame to a plurality of STAs. The trigger frame may include information about the position and size of resources as resource allocation information for each STA. For example, the trigger frame may include information about the AP STA. Therefore, referring to FIG. 30, a MAC header may not include either of first and second address fields. That is, since a transmitter address may be known from identification information about a non-AP STA included in a SIG field, the second address field may not be included. Also, since receiver information may be known from the identification information about the AP STA in the trigger frame, the first address field may not be included. That is, if the plurality of STAs transmit frames in UL MU after receiving the trigger frame, each of the MAC headers may not include either of the first and second address fields. For example, if the AP STA succeeds in decoding a MAC frame in a resource unit allocated by the trigger frame, the AP STA may determine that the identification information about the AP STA has been transmitted to an STA indicated by the trigger frame. For example, the Frame Control field of the MAC header may indicate whether the frame does not include the first address field indicating receiver information and the second address field indicating transmitter information. For example, if the Protocol Version field is set to one of reserved values (2 or 3), this may indicate that the MAC header has been compressed. If the Protocol Version field is 0, the MAC header may be a legacy MAC header (11a/b/g/n/ac). If the Protocol Version field is 1, it may indicate a Short MAC header. As described before, the Protocol Version field may be set to a reserved value 2 or 3 to indicate a UL MU MAC header. For example, if a Short MAC header is not used, the Protocol Version field may be set to 1 to indicate a UL MU MAC header.

For example, referring to (a), (b), and (c) of FIG. 30, the MAC header may not include a Duration field, a third address field, and a fourth address field. Since the trigger frame includes the identification information about the AP STA and identification information about a non-AP STA, the first, second, and third address fields may be omitted. Further, the fourth address field may not be needed in a UL MU operation, and thus the fourth address field may also be omitted. For example, since an STA other than an AP may not be capable of reading a MAC frame in UL MU, the above address fields may not be needed. Further, for example, the Duration field for NAV setting may also be omitted because it may be included in another field of a PPDU. For example, another field of the PPDU may be a SIG field of a PPDU preamble. Further, the Sequence Control field may also be omitted, for example, in a MAC frame without an A-MPDU. That is, a field carrying unnecessary or omittable information may not be included in a MAC header, thereby reducing radio resource consumption and overhead.

Also, for example, it may be indicated by one of the reserved values of the Protocol Version field of the Frame Control field in the MAC header that the MAC header has been compressed. That is, the Frame Control field of the MAC header may indicate that the frame format of the MAC header has been changed, and the present disclosure is not limited to the foregoing embodiment.

FIG. 31 is a view illustrating a method for transmitting frames based on a trigger frame by a plurality of STAs. As described before, an AP STA may transmit a trigger frame. The trigger frame may include one of a BSSID and a PBSSID as identification information about the AP. The trigger frame may further include one of an AID, a Partial AID, and a MAC address for each of the STAs. If the plurality of STAs transmit a UL MU frame, each of the STAs may transmit a frame using the afore-described UL MU MAC header. That is, the STA may use a compressed MAC header without information of the afore-described address fields. For example, the Protocol Version field of the Frame Control field may be set to a reserved value 2 or 3, as described before. Also, the Duration field, the Sequence Control field, and so on may be omitted as described before.

For example, a BSS Color as identification information about a BSS may be included in a HE-SIG A field of the trigger frame. The PBSSID may be included, for example, as resource allocation information. If the BSS Color is 6 bits and the PBSSID is 9 bits, the PBSSID may be set to BSSID[32:41]. If the PBSSID is N bits long and the BSS Color is M bits long, the above configuration may be generalized in such as manner that the PBSSID included in the trigger frame is determined to be BSSID[47-M-N:47-M].

FIG. 32 is a view illustrating an exemplary ACK control frame configured based on FIG. 31. As described before, a frame with a compressed MAC header without some fields may be transmitted. Referring to FIG. 32, for example, an ACK control frame may be configured only with a Frame Control field and an FCS field. The Protocol Version field of the Frame Control field may be set to a reserved value 2 or 3, as described before. The subtype of the Frame Control field may be "ACK". Since the frame is an ACK control frame, it may not include a Frame Body field. The FCS field may be shorter than 4 bytes, for example, 2 bytes, 1 byte, or 4 bits long, which should not be construed as limiting the present disclosure.

FIG. 33 is a view illustrating a MAC frame structure based on random access.

An AP STA may allocate MU resources for random access by a trigger frame. The trigger frame may not indicate a specific STA in view of the nature of random access. For example, if STAs receive the trigger frame, the STAs may transmit frames by randomly accessing positions at which the random access resources are allocated. That is, a plurality of STAs may transmit frames by random access. The frames transmitted by random access should include information indicating the transmitting STAs. That is, the trigger frame transmitted by the AP STA may not include information about a specific STA regarding a part allocated for random access. Therefore, even though a compressed MAC header does not include receiver information, a second address field indicating transmitter information needs to be included, as described before. For example, the second address field indicating transmitter information may include the AID or MAC address of an STA. For example, the Frame Control field may indicate whether the AID or MAC address is included. More specifically, in the case where an AID has not been allocated to the STA (e.g., an unassociated STA), when the STA uses the resources for random access indicated by the trigger frame, the STA may include the MAC address in the second address field. This may be indicated by the Frame Control field. The indication may be made by a field other than the Frame Control field. For example, an indicator indicating a Short MAC header/compressed MAC header/UL MU MAC header, indicating whether the AID or MAC address is included, or indicating which one between the AID and the MAC address is included may be included using a specific reserved field or value of the Service field. On the assumption that one of the AID and the MAC address is always used in the MAC header in the system, the indicator indicating the AID or MAC address does not need to be included and the second address field may be fixed to one of 2 bytes and 6 bytes. For example, an STA to which an AID has been allocated (e.g., an associated STA) may include its AID in the second address field.

In another example, referring to (b) of FIG. 33, if a SIG field includes transmitter information in the case of random access, both the first and second address fields may be omitted as in the afore-described UL MU MAC frame format. For example, the SIG field may be HE-SIG. The transmitter information may be, for example, one of the AID, Partial AID, and MAC address of an STA. That is, if the SIG field includes information about the STA, a compressed MAC frame without the first and second address fields may be used despite random access, as described before. On the assumption that one of an AID, Partial AID, and MAC address as transmitter information, for example, the Partial AID is included in a HE-SIG field of a UL MU frame, an STA to which a Partial AID has been allocated may include an AID in the Partial AID and one of the IDs (AID and MAC address) of the STA in the MAC header. An STA to which a Partial AID has not been allocated (e.g., an unassociated STA) may set the Partial AID to a specific value (e.g., all 1s or 0s in bits) and include its ID (AID or MAC address) in the MAC header. In this case, the receiver (i.e., AP) may determine whether transmitter information (AID or MAC address) is included, based on Partial AID information included in a HE-SIG field.

Figure 34:
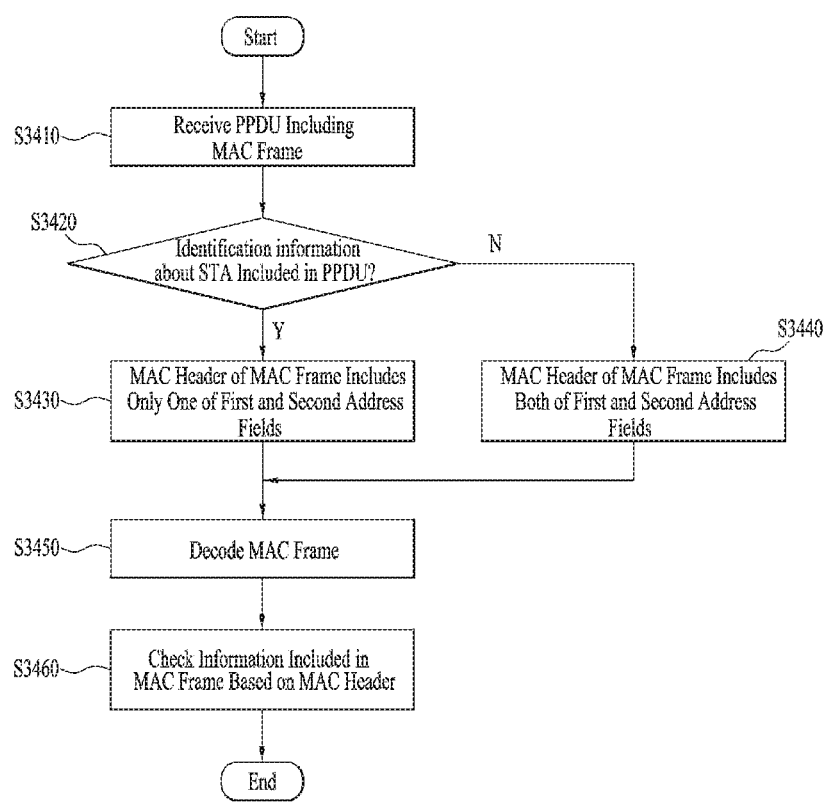
FIG. 34 is a flowchart illustrating a method for receiving a signal at an STA.

FIG. 34 is a flowchart illustrating a method for receiving a signal at an STA. The STA may receive data including a MAC frame (S3410). As described before with reference to FIG. 14, the data received by the STA may be a PPDU. That is, the PPDU may include the MAC frame and may be received at the STA.

Subsequently, the STA may determine whether the data includes identification information about the STA (S3420). As described before with reference to FIG. 26, the data may be a PPDU. The identification information about the STA may be a Partial AID or an AID. For example, the identification information about the STA may be included in a SIG field of the PPDU.

If the data includes the identification information about the STA, the STA may include only one of first and second address fields in the MAC header of a MAC frame and transmit the MAC frame (S3430). On the other hand, if the data does not include the identification information about the STA, the STA may include both of the first and second address fields in the MAC header of the MAC frame and transmit the MAC frame (S3440). As described before with reference to FIG. 26, in the case where the identification information about the STA is included in the SIG field of the PPDU, if the identification information about the STA is not included redundantly in the MAC header, waste of radio resources may be prevented. For example, the first address field may provide receiver information, and the second address field may provide transmitter information, as described before. If the MAC frame is received on DL, the STA may include only the second address field as transmitter information. If the MAC frame is received on UL, the STA may include only the first address field as receiver information. That is, the MAC header may not include information redundant with the SIG field, thereby preventing waste of radio resources.

Now, a description will be given of decoding a UL MU frame transmitted by a plurality of STAs in a resource area allocated by a trigger frame at an AP. The AP may decode MAC frames of the UL MU frame based on information transmitted by the trigger frame (e.g., resource allocation area information, MU STA identification information, MCS/Rate, $N_{sts}$, etc.) (S3450), and check information included in the MAC frames (S3460). For example, the information included in the MAC frames may be included in MPDUs.

Figure 35:
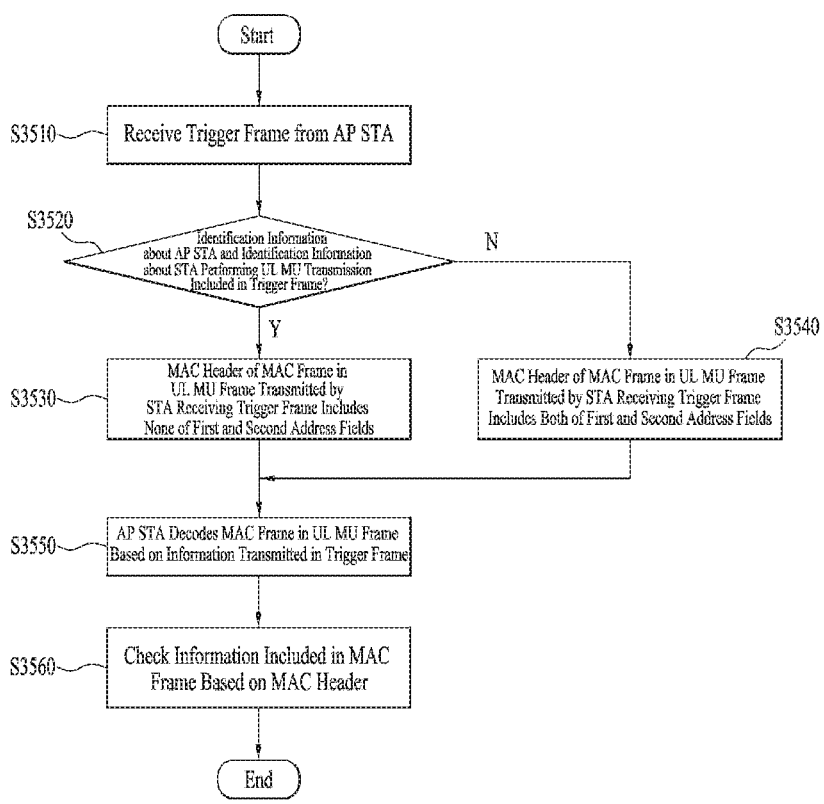
FIG. 35 is a flowchart illustrating a method for performing a UL MU transmission after receiving a trigger frame at an STA according to an embodiment of the present disclosure.

FIG. 35 is a flowchart illustrating a method for performing a UL MU transmission after receiving a trigger frame at an STA according to an embodiment of the present disclosure.

An STA that performs a UL MU transmission may receive a trigger frame from an AP STA (S3510). The STA may determine whether the trigger frame includes identification information about the AP STA and identification information about the STA performing a UL MU transmission (S3520). As described before with reference to FIG. 31, one of a BSSID and a PBSSID may be included as the identification information about the AP STA in the trigger frame. One of an AID, a Partial AID, and a MAC address may be included as the identification information about the STA performing a UL MU transmission. If a plurality of STAs transmit a UL MU frame, each STA may transmit a frame using the afore-described UL MU MAC header. The UL MU STAs may use the information included in the trigger frame in transmitting the UL MU frame.

If the trigger frame includes the identification information about the AP STA and the identification information about the STAs performing UL MU transmissions (it is assumed that identification information about an AP and STAs is generally included in a trigger frame), both first and second address fields may be omitted in each of the MAC headers of MAC frames in the UL MU frame transmitted by the plurality of STAs which have received the trigger frame (S3530). On the other hand, if the trigger frames does not include the identification information about the AP STA and the identification information about the STAs performing UL MU transmissions, both of the first and second address fields may be included in each of the MAC headers of the MAC frames in the UL MU frame transmitted by the plurality of STAs which have received the trigger frame (S3540). In other words, if the trigger frame already includes the identification information about the AP STA and the identification information about the STAs performing UL MU transmissions, information in the first and second address fields of the MAC headers may be redundant and thus omitted. As a consequence, waste of radio resources may be prevented.

Now, a description will be given of decoding a UL MU frame transmitted by a plurality of STAs in a resource area allocated by a trigger frame at an AP STA. The AP STA may decode MAC frames of the UL MU frame based on information transmitted by the trigger frame (e.g., resource allocation area information, MU STA identification information, MCS/Rate, $N_{sts}$, etc.) (S3550), and check information included in the MAC frames (S3560). For example, the information included in the MAC frames may be included in MPDUs.

Figure 36:
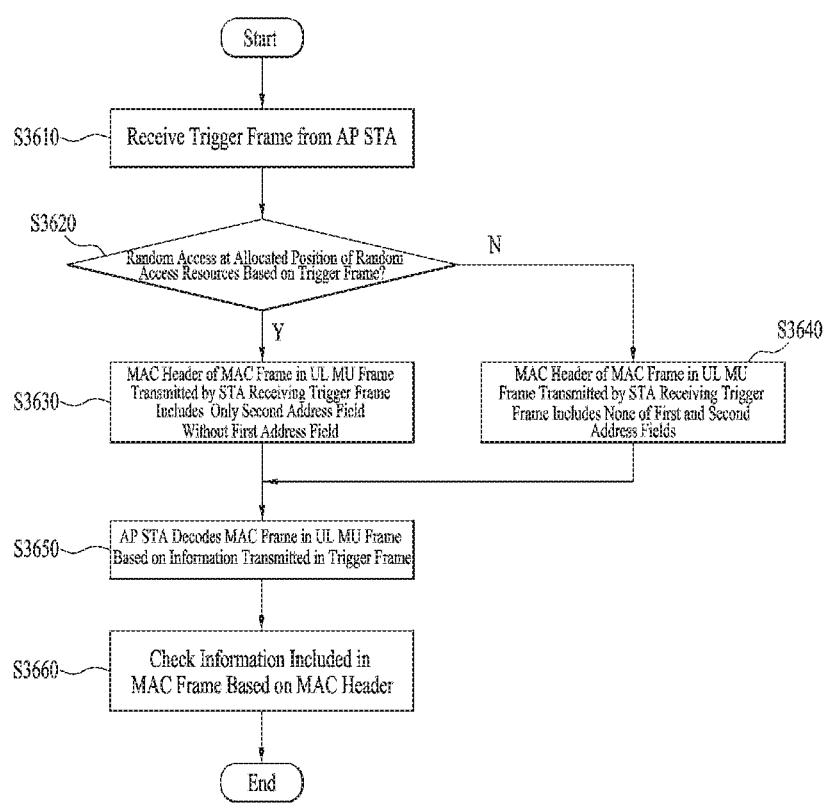
FIG. 36 is a flowchart illustrating a method for performing a UL MU transmission based on random access information included in a trigger frame after receiving the trigger frame at an STA according to an embodiment of the present disclosure.

FIG. 36 is a flowchart illustrating a method for performing a UL MU transmission based on random access information included in a trigger frame after receiving the trigger frame at an STA according to an embodiment of the present disclosure.

The STA performing a UL MU transmission may receive a trigger frame from an AP STA (S3610). The STA may determine whether random access is to be performed at an allocated position of random access resources based on the trigger frame (S3620). As described before with reference to FIG. 32, the AP STA may allocate MU resources for random access by the trigger frame. In view of the nature of random access, the trigger frame may include only resource allocation information, not indicating a specific STA. For example, upon receipt of the trigger frame, STAs may transmit frames by randomly accessing the allocated position of the random access resources. That is, a plurality of STAs may transmit frames by random access. The frames transmitted by random access should include information identifying the transmitting STAs. Therefore, if random access is performed at the allocated position of the random access resources based on the trigger frame, each of the MAC headers of MAC frames in a UL MU frame transmitted by the plurality of STAs that have received the trigger frame may include only a second address field without a first address field (S3630). On the other hand, if random access is not performed at the allocated position of the random access resources based on the trigger frame, each of the MAC headers of the MAC frames in the UL MU frame transmitted by the plurality of STAs that have received the trigger frame may not include either of the first and second address fields (S3640). That is, regarding a part allocated for random access, information about a specific STA may not be included, and thus transmitter information as information about an STA transmitting a frame may be included in a MAC header.

Now, a description will be given of decoding a UL MU frame transmitted by a plurality of STAs in a resource area allocated by a trigger frame at an AP STA. The AP STA may decode MAC frames of the UL MU frame based on information transmitted by the trigger frame (e.g., resource allocation area information, MU STA identification information, MCS/Rate, $N_{sts}$, etc.) (S3650), and check information included in the MAC frames (S3660). For example, the information included in the MAC frames may be included in MPDUs.

Figure 37:
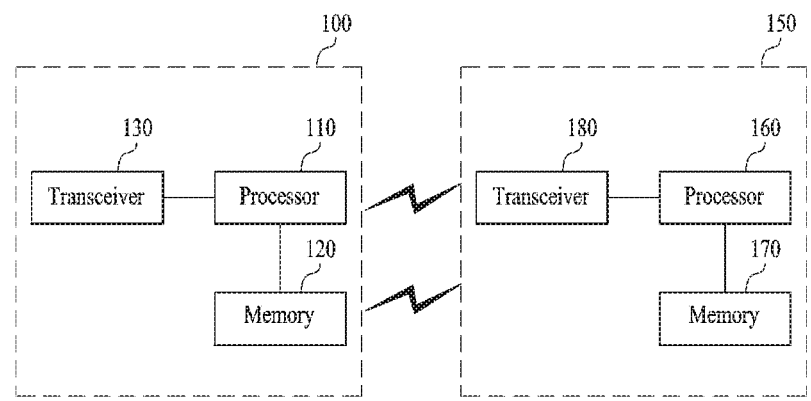
FIG. 37 is a block diagram illustrating exemplary configurations of an AP (or Base Station (BS)) and an STA (or User Equipment (UE)).

FIG. 37 is a block diagram illustrating exemplary configurations of an AP (or BS) and an STA (or UE).

An AP 100 may include a processor 110, a memory 120, and a transceiver 130. An STA 150 may include a processor 160, a memory 170, and a transceiver 180.

The transceivers 130 and 180 may transmit and receive wireless signals, for example, implement the PHY layer in an IEEE 802 system. The processors 110 and 160 may be connected to the transceivers 130 and 180, and implement the PHY layer and/or the MAC layer in the IEEE 802 system. The processors 110 and 160 may be configured to perform one or a combination of two or more of the foregoing various embodiments of the present disclosure. Further, modules that perform AP and STA operations according to the foregoing various embodiments of the present invention may be stored in the memories 120 and 170 and executed by the processors 110 and 160. The memories 120 and 170 may be included inside the processors 110 and 160, or may be installed outside the processors 110 and 160 and connected to the processors 110 and 160 by known means.

The above descriptions of the AP 100 and the STA 150 are applicable to a BS and a UE, respectively in other wireless communication systems (e.g., an LTE/LTE-A system).

The above specific configurations of an AP and an STA may be implemented in such a manner that the various embodiments of the present disclosure may be implemented independently or simultaneously in a combination of two or more of them. Redundant descriptions will not be provided herein, for clarity.

Figure 38:
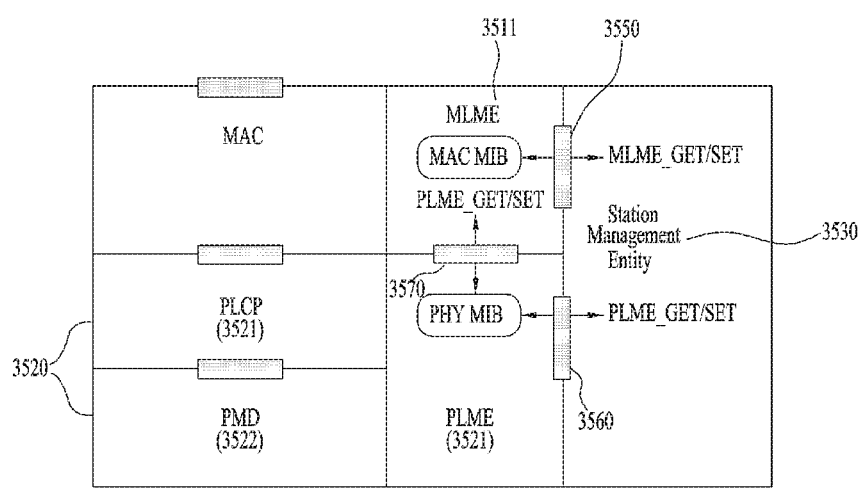
FIG. 38 is a view illustrating an exemplary structure of a processor in an AP or an STA.

FIG. 38 is a view illustrating an exemplary structure of a processor in an AP or STA according to an embodiment of the present disclosure.

The processor of the AP or STA may have a multi-layered structure. FIG. 38 focuses on a MAC sublayer 3810 of a Data Link Layer (DLL) and a PHY layer 3820 among a plurality of layers. Referring to FIG. 38, the PHY layer 3820 may include a PLCP entity 3821, and a Physical Medium Dependent (PMD) entity 3822. Each of the MAC sublayer 3810 and the PHY layer 3820 includes a management entity conceptually called MAC sublayer Management Entity (MLME) 3811. These entities 3811 and 3821 provide layer management service interfaces through which layer management functions may be invoked.

In order to provide a correct MAC operation, a Station Management Entity (SME) 3830 is present in each STA. The SME 3830 is a layer-independent entity that may be viewed as residing in a separate management plane or as residing off to the side. The exact functions of the SME 3830 are not specified herein, but in general, this entity may be viewed as being responsible for such functions as gathering of information about layer-dependent statuses from various Layer Management Entities (LMEs) and similar setting of the values of layer-specific parameters. The SME 3830 may typically perform such functions on behalf of general system management entities and may implement standard management protocols.

The entities illustrated in FIG. 38 interact with one another in various ways. FIG. 38 illustrates a couple of examples of exchanging GET/SET primitives. An XX-GET.request primitive is used to request the value of a given Management Information Base (MIB) attribute. An XX-GET.confirm primitive returns an appropriate MIB attribute value if Status is set to "success" and otherwise, returns an error indication in a Status field. An XX-SET.request primitive is used to request that an indicated MIB attribute be set to a given value. If this MIB attribute implies a specific action, then this requests that the action be performed. An XX-SET.confirm primitive confirms that an indicated MIB attribute was set to a requested value, if Status is set to "success," and otherwise, it returns an error condition in the Status field. If this MIB attribute implies a specific action, then this confirms that the action was performed.

As illustrated in FIG. 38, the MLME 3811 and the SME 3830 may exchange various MLME_GET/SET primitives via an MLME Service Access Point (MLME_SAP) 3850.

Also, various PLCM_GET/SET primitives may be exchanged between the PLME 3821 and the SME 3830 via a PLME_SAP 3860 and between the MLME 3811 and the PLME 3870 via an MLME-PLME_SAP 3870.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In a firmware or software configuration, the method according to the embodiments of the present invention may be implemented in the form of modules, procedures, functions, or the like that perform the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. While the preferred embodiments of the present disclosure have been illustrated and described, the present disclosure is not limited to the foregoing specific embodiments, and those skilled in the art can make various modifications within the scope and spirit of the present disclosure claimed in the appended claims. Further, these modified embodiments should not be understood individually from the technical spirit or perspective of the present disclosure.

Both a product invention and a process invention are described in the present disclosure, and the descriptions of the inventions may be applied complementarily, when needed.

INDUSTRIAL APPLICABILITY

While the method and apparatus for configuring an RS for three-dimensional (3D) MIMO in a wireless communication system have been described in the context of a 3GPP LTE system, they are applicable to various wireless communication systems other than the 3GPP LTE system.

The invention claimed is:

1. A method for receiving a signal by a Station (STA) in a Wireless Local Area Network (WLAN) system, the method comprising:
   receiving, by the STA, a downlink (DL) Physical layer Protocol Data Unit (PPDU) including a physical layer (PHY) header and a Medium Access Control (MAC) frame;
   decoding, by the STA, the MAC frame;
   checking, by the STA, information included in the MAC frame based on a MAC header of the MAC frame, the MAC header including at least one of a first address field or a second address field; and
   transmitting, by the STA to an access point (AP), an uplink (UL) PPDU including a PHY header,
   wherein each of the PHY headers of the DL PPDU and the UL PPDU includes a signal (SIG) field having an UL/DL indication subfield and a STA identifier (ID) subfield,
   wherein whether the STA ID subfield is an association identifier (AID) subfield of a transmitter or an AID subfield of a receiver is identified based on a UL/DL direction indicated by the UL/DL indication subfield,
   wherein when the UL/DL indication subfield indicates the DL direction, the STA determines that the STA ID subfield is configured as the AID subfield of the receiver, and
   wherein when the UL/DL indication subfield indicates the UL direction, the STA determines that the STA ID subfield is configured as the AID subfield of the transmitter instead of the AID subfield of the receiver.

2. The method according to claim 1, wherein the first address field indicates a receiver address, and the second address field indicates a transmitter address.

3. The method according to claim 1, wherein the MAC frame of the DL PPDU includes only the second address field without the first address field.

4. The method according to claim 1, wherein the MAC header further includes a Frame Control field.

5. The method according to claim 4, wherein the Frame Control field includes a Type field, and
   wherein if the Type field is set to a first value, the MAC header includes only one of the first address field and the second address field.

6. The method according to claim 1, wherein if a trigger frame is received from the AP before receiving the DL PPDU, the MAC header does not include either of the first address field and the second address field.

7. The method according to claim 6, wherein the MAC header is a compressed MAC header.

8. The method according to claim 6, wherein the MAC frame further includes a Duration field.

9. The method according to claim 6, wherein if the AP performs MU resource allocation for random access by the trigger frame and the STA transmits UL data by randomly accessing an allocated position of the random access resources, the MAC header includes only the second address field without the first address field.

10. The method according to claim 1, wherein the SIG field includes a signal-A (SIG-A) field and a signal-B (SIG-B) field.

11. The method according to claim 1, wherein the DL PPDU is a multi-user (MU) PPDU that is intended to a group of STAs, and the STA ID subfield of the MU PPDU includes a bitmap including a plurality of bits for the group of STAs.

12. A Station (STA) for receiving a signal in a Wireless Local Area Network (WLAN) system, the STA comprising:
   a transceiver module for exchanging data with an external device; and
   a processor for controlling the transceiver module,
   wherein the processor is configured to:
   receive a downlink (DL) Physical layer Protocol Data Unit (PPDU) including a physical layer (PHY) header and a Medium Access Control (MAC) frame through the transceiver module,
   decode the MAC frame, and
   check information included in the MAC frame based on a MAC header of the MAC frame, the MAC header including at least one of a first address field or a second address field, and transmit, to an access point (AP), an uplink (UL) PPDU including a PHY header, wherein each of the PHY headers of the DL PPDU and the UL PPDU includes a signal (SIG) field having an UL/DL indication subfield and a STA identifier (ID) subfield, wherein whether the STA ID subfield is an association identifier (AID) subfield of a transmitter or an AID subfield of a receiver is identified based on a UL/DL direction indicated by the UL/DL indication subfield, wherein when the UL/DL indication subfield indicates the DL direction, the processor determines that the STA ID subfield is configured as the AID subfield of the receiver, and wherein when the UL/DL indication subfield indicates the UL direction, the processor determines that the STA ID subfield is configured as the AID subfield of the transmitter instead of the AID subfield of the receiver.

13. The STA according to claim 12, wherein the first address field indicates a receiver address, and the second address field indicates a transmitter address.

* * * * *